United States Patent
Masuda et al.

(10) Patent No.: US 9,498,708 B2
(45) Date of Patent: Nov. 22, 2016

(54) SYSTEMS AND METHODS FOR PROCESSING POSITIONAL AND SOUND INPUT OF USER INPUT TO A TOUCH PANEL

(75) Inventors: Takumi Masuda, Kyoto (JP); Ryosuke Kanata, Kyoto (JP); Yoshinobu Nakano, Kyoto (JP); Masahiko Nishimura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 1470 days.

(21) Appl. No.: 12/333,867

(22) Filed: Dec. 12, 2008

(65) Prior Publication Data

US 2009/0163282 A1 Jun. 25, 2009

(30) Foreign Application Priority Data

Dec. 25, 2007 (JP) ................................ 2007-332778

(51) Int. Cl.
| | |
|---|---|
| A63F 9/24 | (2006.01) |
| A63F 13/215 | (2014.01) |
| A63F 13/42 | (2014.01) |
| A63F 13/40 | (2014.01) |
| A63F 13/2145 | (2014.01) |

(52) U.S. Cl.
CPC ............ *A63F 13/215* (2014.09); *A63F 13/10* (2013.01); *A63F 13/42* (2014.09); *A63F 13/2145* (2014.09); *A63F 2300/1006* (2013.01); *A63F 2300/1068* (2013.01); *A63F 2300/204* (2013.01); *A63F 2300/6045* (2013.01); *A63F 2300/6072* (2013.01)

(58) Field of Classification Search
USPC ................................ 463/7, 36, 37; 345/177
See application file for complete search history.

(56) References Cited

U.S. PATENT DOCUMENTS

| | | | | |
|---|---|---|---|---|
| 7,909,698 | B2* | 3/2011 | Onoda et al. | 463/36 |
| 2003/0234769 | A1* | 12/2003 | Cross et al. | 345/173 |
| 2005/0083313 | A1* | 4/2005 | Hardie-Bick | 345/177 |
| 2005/0101364 | A1* | 5/2005 | Onoda et al. | 463/7 |
| 2005/0130740 | A1* | 6/2005 | Onoda et al. | 463/36 |
| 2005/0137942 | A1* | 6/2005 | LaFleur | 705/27 |
| 2005/0288099 | A1 | 12/2005 | Shimizu et al. | |

(Continued)

FOREIGN PATENT DOCUMENTS

| | | |
|---|---|---|
| JP | 2005-218778 | 8/2005 |
| JP | 2005-318996 | 11/2005 |

OTHER PUBLICATIONS

Office Action for Japanese Patent Appln. No. 2007-332778, issued Jan. 18, 2013.

*Primary Examiner* — Peter Bradford
(74) *Attorney, Agent, or Firm* — Nixon & Vanderhye P.C.

(57) ABSTRACT

A game apparatus detects an input position, on an input plane, at which an input operation has been performed. The game apparatus also detects an operation sound that occurs due to the input operation performed on the input plane. The game apparatus evaluates the detected operation sound, and obtains a result of the evaluation (e.g., volume of the operation sound). The game apparatus performs game processing by using the detected input position and the result of the evaluation. This enables the game apparatus to perform more complex processing by using a touch operation as input information, and allows a player to provide more complex instructions based on the touch operation.

29 Claims, 11 Drawing Sheets

(56) References Cited

U.S. PATENT DOCUMENTS

| | | | |
|---|---|---|---|
| 2006/0204012 A1* | 9/2006 | Marks et al. | 381/26 |
| 2006/0279553 A1* | 12/2006 | Soss et al. | 345/173 |
| 2007/0060336 A1* | 3/2007 | Marks et al. | 463/30 |
| 2007/0077541 A1* | 4/2007 | Champagne et al. | 434/62 |
| 2007/0178952 A1* | 8/2007 | Ehara et al. | 463/1 |
| 2007/0222674 A1* | 9/2007 | Tan et al. | 342/357.02 |
| 2008/0058101 A1* | 3/2008 | Hato | 463/35 |
| 2008/0058102 A1* | 3/2008 | Hato | 463/35 |
| 2008/0102958 A1* | 5/2008 | Kitamura et al. | 463/42 |
| 2008/0113793 A1* | 5/2008 | Miyamoto et al. | 463/31 |
| 2008/0139310 A1* | 6/2008 | Kando et al. | 463/33 |
| 2008/0146333 A1* | 6/2008 | Kando et al. | 463/33 |
| 2008/0200224 A1* | 8/2008 | Parks | 463/7 |
| 2008/0261693 A1* | 10/2008 | Zalewski | 463/31 |
| 2008/0284755 A1* | 11/2008 | Hardie-Bick | 345/177 |
| 2008/0318684 A1* | 12/2008 | Rofougaran | 463/39 |
| 2009/0002340 A1* | 1/2009 | Van Genechten | 345/175 |
| 2010/0285841 A1* | 11/2010 | Jolivet et al. | 455/558 |

\* cited by examiner

F I G. 4
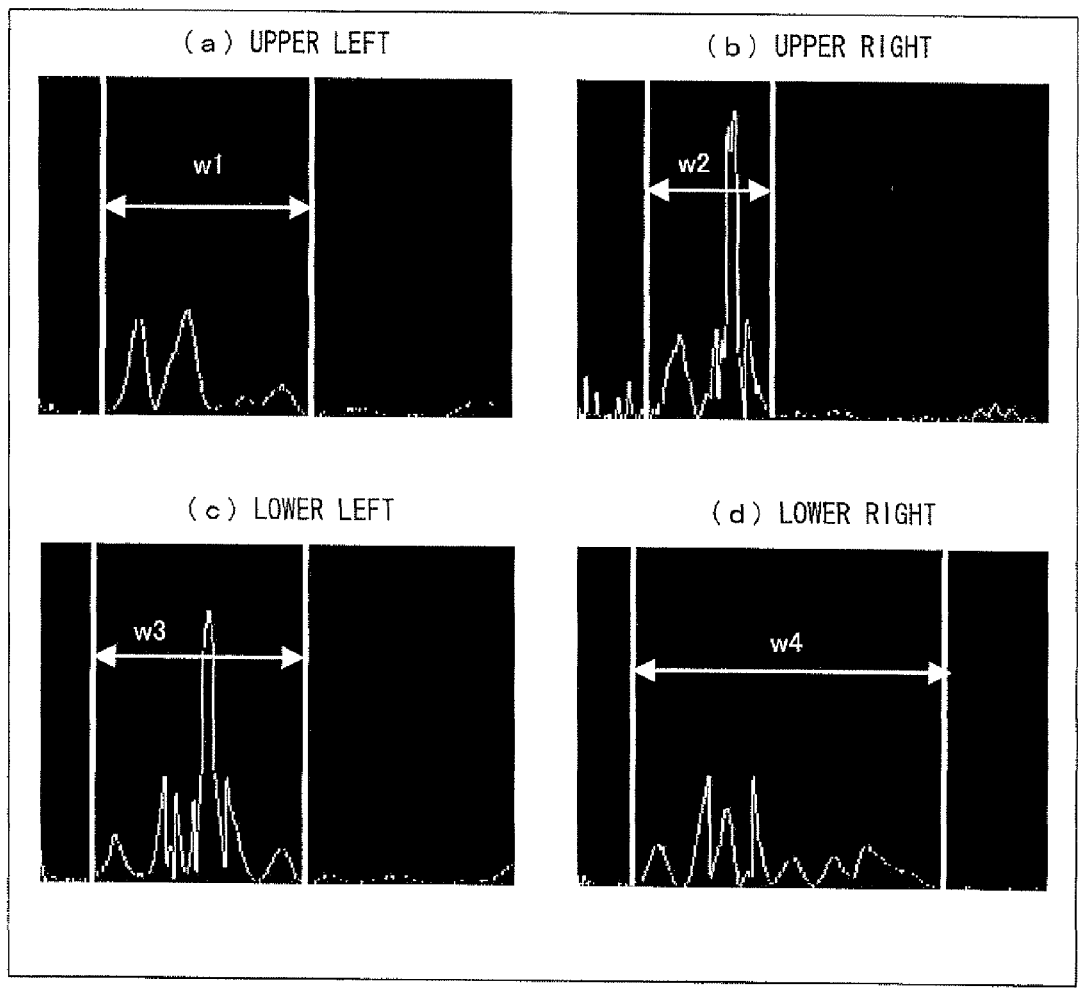

FIG. 7

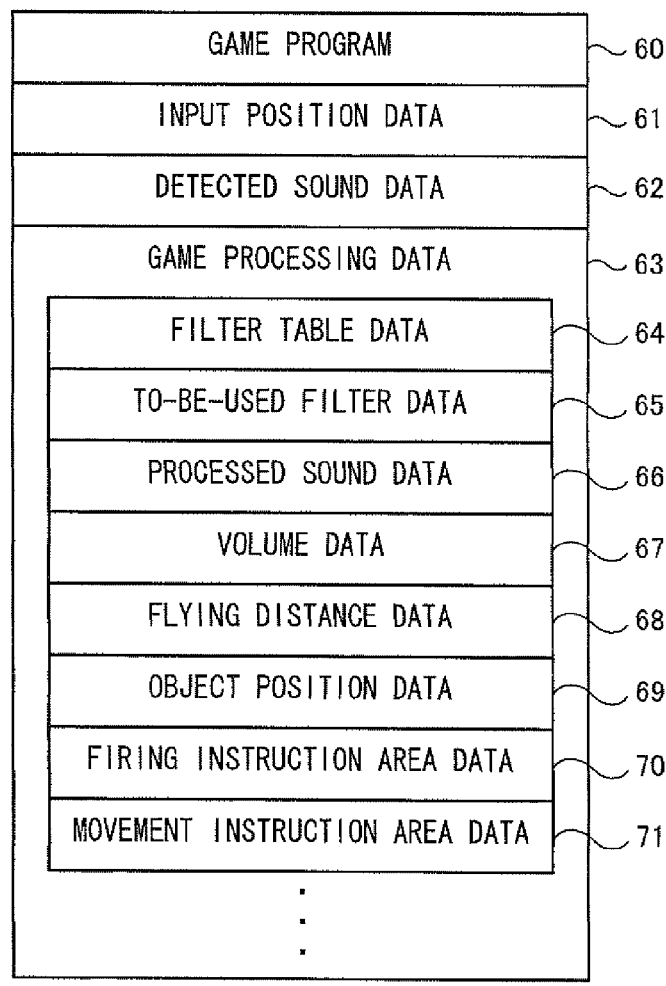

| GAME PROGRAM | ~60 |
| INPUT POSITION DATA | ~61 |
| DETECTED SOUND DATA | ~62 |
| GAME PROCESSING DATA | ~63 |
| FILTER TABLE DATA | ~64 |
| TO-BE-USED FILTER DATA | ~65 |
| PROCESSED SOUND DATA | ~66 |
| VOLUME DATA | ~67 |
| FLYING DISTANCE DATA | ~68 |
| OBJECT POSITION DATA | ~69 |
| FIRING INSTRUCTION AREA DATA | ~70 |
| MOVEMENT INSTRUCTION AREA DATA | ~71 |

FIG. 8

| AREA | TO-BE-USED FILTER |
|---|---|
| UPPER LEFT AREA | FIRST FILTER |
| UPPER RIGHT AREA | SECOND FILTER |
| LOWER LEFT AREA | THIRD FILTER |
| LOWER RIGHT AREA | FOURTH FILTER |

SYSTEMS AND METHODS FOR PROCESSING POSITIONAL AND SOUND INPUT OF USER INPUT TO A TOUCH PANEL

CROSS REFERENCE TO RELATED APPLICATION

The disclosure of Japanese Patent Application No. 2007-332778, filed Dec. 25, 2007, is incorporated herein by reference.

FIELD

The technology herein relates to a computer-readable storage medium for storing a game program and to a game apparatus. The technology herein also particularly relates to a computer-readable storage medium for storing a game program of a game to be played using an input device such as a touch panel, touch pad or the like, and to a game apparatus.

BACKGROUND AND SUMMARY

Conventionally, game apparatuses, which allow a player to perform game operations using a touch panel, have been proposed. For example, Japanese Laid-Open Patent Publication No. 2005-218778 discloses a game apparatus which allows a player to perform game operations using a touch panel and operation keys. This game apparatus allows a player to control a control object by using the touch panel and the operation keys. When performing an input on the touch panel, the player performs an operation to touch an input plane of the touch panel (touch operation). The game apparatus detects a position which has been inputted by this touch operation (i.e., detects a touched position) (hereinafter, referred to as an input position). The game apparatus uses the input position as an instruction from the player, and performs game processing.

Conventionally, the input position is the only input information obtained from the touch operation. That is, information obtained from the touch operation is a single type of information. For this reason, game processing which can be performed by the touch operation is limited, and complex processing cannot be performed by using a single touch operation as input information. For example, Japanese Laid-Open Patent Publication No. 2005-218778 discloses that a player performs a touch operation on an object appearing in a game space in order to specify the object. An instruction to specify the object is the only instruction the player can provide by the touch operation. In other words, processing to specify the object is the only processing which is performed by using the touch operation as input information. In order to perform processing to cause the specified object to perform a particular action, the player is required to perform an additional operation on the touch panel or on the operation keys.

Therefore, certain example embodiments provide a computer-readable storage medium for storing a game program and a game apparatus, which allow more complex processing to be performed by a touch operation.

Certain example embodiments have the following features to achieve the object mentioned above. Note that, reference numerals, supplementary descriptions and the like indicated between parentheses herein are merely provided to facilitate the understanding of the present invention as claimed in the claims in relation to the later-described embodiment, rather than limiting the present invention in any way.

A first aspect of the present invention is a computer-readable storage medium for storing a game program (60) to be executed by a computer (CPU core 21) of a game apparatus (10) comprising: an input device having an input plane on which an input operation is performed (touch panel 15); and a microphone (33). The game program causes the computer to perform an input position obtaining step (S2), a first operation sound obtaining step (S3) and a game process step (S4, S6). At the input position obtaining step, the computer obtains, from the input device, an input position on which the input operation has been performed. At the first operation sound obtaining step, the computer obtains, from the microphone, an operation sound occurring due to the input operation. At the game process step, the computer performs a game process by using the input position obtained at the input position obtaining step and the operation sound obtained at the first operation sound obtaining step.

In a second aspect of the present invention, the game program may further cause the computer to perform a feature information calculation step (S5) of calculating, by performing a predetermined calculation process on the operation sound obtained at the first operation sound obtaining step, feature information indicating a feature of the operation sound. In this case, at the game process step, the computer performs the game process by using the input position obtained at the input position obtaining step and the feature information, and at the feature information calculation step, the computer changes a detail of the predetermined calculation process in accordance with the input position obtained at the input position obtaining step.

In a third aspect of the present invention, the feature information calculation step may include a filter determining step (S21), a filtering process step (S23) and a feature calculation step (S24). At the filter determining step, the computer determines, based on the input position, a characteristic of a filter to be used at the predetermined calculation process. At the filtering process step, the computer performs a filtering process on a signal of the operation sound, by using the determined characteristic of the filter. At the feature calculation step, the computer calculates the feature information from the operation sound on which the filtering process has been performed. In certain example embodiments, the filter performs some kind of arithmetic processing on input data, and outputs different data from the input data. The filter is not limited to such a filter as a high-pass filter, low-pass filter, or a band-pass filter for extracting a particular frequency component, but includes, for example, a filter for amplifying a particular frequency component of input data and outputting the amplified frequency component.

In a fourth aspect of the present invention, at the filter determining step, the computer may determine, based on the input position, a frequency passband of the filter to be used.

In a fifth aspect of the present invention, the feature information calculation step may include a rate determining step, an amplifying process step and a feature calculation step. At the rate determining step, the computer determines, based on the input position, an amplification rate for amplifying a signal of the operation sound. At the amplifying process step, the computer performs a process for amplifying the signal of the operation sound by using the determined amplification rate. At the feature calculation step, the computer calculates, from the operation sound on which the process for amplifying the signal of the operation sound has been performed, volume of the operation sound, as the feature information.

In a sixth aspect of the present invention, the game program may further cause the computer to perform an instruction step (S31), a second operation sound obtaining step (S33), a process determining step (S35) and a storing step (S36). At the instruction step, the computer instructs a user to perform an input operation on the input plane. At the second operation sound obtaining step, the computer obtains, from the microphone, an operation sound occurring due to the input operation that is performed, in response to an instruction provided at the instruction step, on a position within a predetermined area of the input plane. At the process determining step, the computer determines, based on the operation sound obtained at the second operation sound obtaining step, a detail of the predetermined calculation process that is to be performed when an input operation is performed on a position within the predetermined area. At the storing step, the computer generates and stores association data that associates the predetermined area with the determined detail of the predetermined calculation process. In this case, at the feature information calculation step, when the input position is within the predetermined area, the computer performs the predetermined calculation process in accordance with the detail of the predetermined calculation process, which detail is associated with the predetermined area by the association data.

In a seventh aspect of the present invention, the game program may further cause the computer to perform an instruction step, a second operation sound obtaining step and a storing step. At the instruction step, the computer instructs a user to perform an input operation on the input plane. At the second operation sound obtaining step, the computer obtains, from the microphone, an operation sound occurring due the input operation that is performed, in response to an instruction provided at the instruction step, on a position within a predetermined area of the input plane. At the storing step, the computer generates and stores association data that associates the predetermined area with the operation sound obtained at the second operation sound obtaining step. In this case, at the feature information calculation step, when the input position is within the predetermined area, the computer selects the operation sound that is associated with the predetermined area by the association data, and performs, as the predetermined calculation process, a process for comparing the selected operation sound with the operation sound obtained at the first operation sound obtaining step.

In an eighth aspect of the present invention, at the game process step, the computer may determine whether or not the operation sound obtained at the first operation sound obtaining step satisfies a predetermined standard, and when the operation sound satisfies the predetermined standard, the computer may perform the game process using the input position obtained at the input position obtaining step. In this case, a determination whether or not the operation sound satisfies the predetermined standard is performed such that different reference values are used depending on the input position obtained at the input position obtaining step. For example, in the case where the game process step determines whether or not volume of the operation sound obtained at the first operation sound obtaining step is equal to or greater than predetermined volume, different reference values are used depending on the input position obtained at the input position obtaining step. To be more specific, when the input position obtained at the input position obtaining step is close to a setting position of the microphone of the game apparatus, a larger reference value is used, and when the input position is distant from the setting position of the microphone, a smaller reference value is used. As another example, in the case where the game process step determines whether or not a waveform of the operation sound obtained at the first operation sound obtaining step is similar to a reference waveform, different reference waveforms are used depending on the input position obtained at the input position obtaining step.

In a ninth aspect of the present invention, the game program may further cause the computer to perform an instruction step, a second operation sound obtaining step, a reference value setting step and a storing step. At the instruction step, the computer instructs a user to perform an input operation on the input plane. At the second operation sound obtaining step, the computer obtains, from the microphone, an operation sound occurring due to an input operation that is performed, in response to an instruction provided at the instruction step, on a position within a predetermined area of the input plane. At the reference value setting step, the computer sets, based on the operation sound obtained at the second operation sound obtaining step, a reference value which is to be used for the determination when an input operation is performed on a position within the predetermined area. At the storing step, the computer generates and stores association data which associates the predetermined area with the reference value set at the reference value setting step. In this case, at the game process step, when the input position is within the predetermined area, the computer uses the reference value which is associated with the predetermined area by the association data.

In a tenth aspect of the present invention, the game program further causes the computer to perform a feature information calculation step (S5) of calculating, by performing a predetermined calculation process on the operation sound obtained at the first operation sound obtaining step, feature information indicating a feature of the operation sound. The feature information calculation step includes a fundamental step (S24) and a correction step (S25). At the fundamental step, the computer calculates, by performing the predetermined calculation process, the feature information indicating the feature of the operation sound. At the correction step, the computer corrects the feature information in accordance with the input position.

In an eleventh aspect of the present invention, at the fundamental step, the computer may calculate, as the feature information, volume of the operation sound.

In a twelfth aspect of the present invention, at the game process step, the computer may perform, based on the input position obtained at the input position obtaining step and the operation sound obtained at the first operation sound obtaining step, the game process for causing a controlled object to perform a predetermined action.

In a thirteenth aspect of the present invention, the input device may have the input plane set on a display screen that displays a predetermined game image. In this case, the game program further causes the computer to perform an object display step (S10) of displaying a first object (control object 42) on the display screen. The game process step further includes a determination step (S4) and an action control step (S6). At the determination step, the computer determines, when the input position obtained at the input position obtaining step and a display position of the first object are in a predetermined relationship, whether or not to cause a second object (control object), which is same as or different from the first object, to perform the predetermined action. At the action control step, the computer causes, when the determination step has determined to cause the second object to perform the predetermined action, the second object to perform an action corresponding to the operation sound obtained at the first operation sound obtaining step (an action to fire a bullet 43).

In a fourteenth aspect of the present invention, the input device may have the input plane set on a display screen that displays a predetermined game image. In this case, the game program further causes the computer to perform an object display step (S10) of displaying a first object (control object 42) on the display screen. The game process step further includes an object specifying step (S4) and an action control step (S6). At the object specifying step, the computer specifies, when the input position obtained at the input position obtaining step and a display position of the first object are in a predetermined relationship, a second object (a bullet 43) which is same as or different from the first object. At the action control step, the computer causes the second object specified at the object specifying step to perform an action (to move) corresponding to the operation sound obtained at the first operation sound obtaining step.

In a fifteenth aspect of the present invention, the input device may have the input plane set on a display screen that displays a predetermined game image. In this case, the game program further causes the computer to perform an object display step of displaying the controlled object on the display screen. The game process step further includes a first parameter determining step and a second parameter determining step. At the first parameter determining step, the computer determines, based on the input position, a value of a first game parameter relating to the predetermined action of the controlled object (a position on a ball 82, on which the ball 82 is struck). At the second parameter determining step, the computer determines, based on the operation sound obtained at the first operation sound obtaining step, a value of a second game parameter that is different from the first game parameter and which relates to the predetermined action of the controlled object (strength with which to strike the ball 82).

In a sixteenth aspect of the present invention, at the game process step, the computer may determine, based on volume of the operation sound, an amount of the action of the second object.

In a seventeenth aspect of the present invention, at the game process step, the computer may determine, based on the operation sound obtained at the first operation sound obtaining step, a type of the action of the second object.

In an eighteenth aspect of the present invention, at the game process step, the computer may specify, based on the input position, a position in a game space (an originating point of a ripple), and determine, based on the operation sound obtained at the first operation sound obtaining step, a detail of an effect (a magnitude of the ripple) to be provided to the game space in the specified position.

In a nineteenth aspect of the present invention, at the game process step, the computer may determine a degree of the effect in accordance with volume of the operation sound.

In a twentieth aspect of the present invention, at the game process step, the computer may determine a type of the effect in accordance with the operation sound obtained at the first operation sound obtaining step.

In a twenty-first aspect of the present invention, the first operation sound obtaining step may include a detection step (S2) and an obtaining execution step (S3). At the detection step, the computer detects an input performed on the input plane. At the obtaining execution step, the computer obtains, as the operation sound, a sound which is detected by the microphone at a timing that is set in relation to a point when the detection step detects the input.

A twenty-second aspect of the present invention is a game apparatus comprising an input position detecting mechanism (touch panel 15), an operation sound detecting mechanism (microphone 33) and a game process performing mechanism (the CPU core 21 performing step S6). The input position detecting mechanism detects an input position, on an input plane, at which an input operation has been performed. The operation sound detecting mechanism detects an operation sound that occurs due to the input operation performed on the input plane. The game process performing mechanism performs a game process by using the input position and the operation sound obtained by the operation sound detecting mechanism.

According to the first aspect, when an input operation (a touch operation) is performed on the input plane of the input device, a position, on which an input has been performed (an input position), and a sound, which occurs due to the input operation (an operation sound), are obtained. Then, the input position and the operation sound are used for the game process. Since not only the input position but also the operation sound of the single input operation are used as input information, the game apparatus is able to obtain more information from the single input operation, as compared to conventional techniques. Thus, according to the first aspect, more complex processing can be performed based on the touch operation. In other words, since a player is allowed to input, by a single touch operation, more information as compared to conventional techniques, the number of operations to perform is reduced. This allows the player to perform game operations in a simpler manner.

According to the second aspect, the game apparatus changes, in accordance with the input position, the detail of the process for calculating the feature information about the operation sound. There is a case where even if input operations are performed in a same manner, a frequency band, volume or the like of the operation sound varies depending on each input position. However, according to the second aspect, the feature information can be calculated by an appropriate calculation process corresponding to the input position, whereby the feature information is precisely calculated. In other words, the input operation of the player is precisely reflected in the game process.

According to the third aspect, the filtering process is performed on the operation sound. The characteristic of the filter to be used in the filtering process is determined based on the input position. This allows the filtering process to be performed using an appropriate filter corresponding to the input position. In particular, according to the fourth aspect, the frequency passband of the filter is determined based on the input position, whereby a frequency component of the operation sound can be precisely extracted by the filtering process. Even if input operations are performed in a same manner, the volume of the operation sound obtained by the microphone varies depending on a distance between the microphone and each input position.

According to the fifth aspect, the process for amplifying the signal of the operation sound is performed. The amplification rate for the amplifying process is determined based on the input position. This allows the amplifying process to be performed with an appropriate amplification rate corresponding to the input position, whereby the volume of the operation sound can be precisely calculated as the feature information.

According to the sixth aspect, the detail of the calculation process is determined based on the operation sound of an input operation actually performed by the player. At the calculation of the feature information to be used for the game process, the feature information is calculated in accordance with the determined process detail. To be specific, the process detail, which is to be used for an area including a particular position, is determined based on the operation sound of an input operation actually performed on the particular position. By determining the process detail in accordance with the actual operation sound, the process detail can be determined appropriately. Further, even if an appropriate process detail varies depending on a type of, or due to an individual difference of, the game apparatus, the process detail can be determined appropriately.

According to the seventh aspect, the operation sound of an input operation actually performed by the player is stored. At the calculation of the feature information to be used for the game process, the stored operation sound and an inputted operation sound are compared, whereby the feature information is calculated. According to the seventh aspect, the feature information can be calculated by comparing operation sounds of input operations actually performed by the player.

According to the eighth aspect, the game process is performed based on the input position when the operation sound satisfies a predetermined standard. This allows the operation sound to be used to determine whether or not to perform the game process based on the input position. In other words, the game apparatus is able to perform more complex processing based on a touch operation. Further, according to the ninth aspect, a reference value is set based on the operation sound of an input operation actually performed by the player. The set reference value is used when the determination whether or not the operation sound satisfies the predetermined standard is performed in the game process. To be specific, a reference value, which is to be used for an area including a particular position, is set based on the operation sound of an input operation actually performed on the particular position. By setting the reference value based on the actual operation sound, the reference value is set appropriately. The reference value can be set appropriately even if an appropriate reference value varies depending on a type of, or due to an individual difference of, the game apparatus.

According to the tenth aspect, the game apparatus corrects the feature information about the operation sound, in accordance with the input position. As described above, there is a case where even if input operations are performed in a same manner, a frequency band, volume or the like of the operation sound varies depending on each input position. However, according to the tenth aspect, the feature information can be precisely calculated by performing the correction in accordance with the input position. This allows the input operation performed by the player to be precisely reflected in the game process. In particular, according to the eleventh aspect, even if the volume of the operation sound obtained by the microphone varies depending on a distance between the input position and the microphone, a value of the volume can be precisely obtained by correcting the volume in accordance with the input position.

According to the twelfth aspect, in the game in which a controlled object is caused to perform an action, more complex instructions can be provided by a touch operation. This enables the player to provide, by performing a single touch operation, more instructions to the object, as compared to conventional techniques. This allows the player to perform operations for the object in a simpler manner. In particular, according to the thirteenth aspect, an instruction to cause the object to perform an action, and a detail of the action, can be provided by performing a single input operation. According to the fourteenth aspect, an instruction to select an object to be caused to perform an action, and a detail of the action, can be provided by performing a single input operation. According to the fifteenth aspect, two types of parameters relating to an action which the object is to be caused to perform (e.g., a moving direction and a moving amount), can be determined by performing a single input operation. Thus, based on the single input operation, the object can be caused to perform a more complex action. Further, according to the above sixteenth aspect, the player can control the amount of an action to be performed by the object, based on strength of the input operation (volume of the operation sound). According to the seventeenth aspect, the player can control, based on the operation sound, a type of an action to be performed by the object.

According to the eighteenth aspect, in the game in which a predetermined effect is provided to the game space, more complex instructions can be provided by a touch operation. In particular, according to the nineteenth aspect, the player can control a degree of the effect, based on strength of the input operation (volume of the operation sound). Further, according to the twentieth aspect, the player can control, based on the operation sound, a type of the effect to be provided.

According to the twenty-first aspect, the operation sound can be precisely obtained, by obtaining a sound from the microphone at a timing that is determined in relation to a timing at which the input operation is performed.

These and other objects, features, aspects and advantages of certain example embodiments will become more apparent from the following detailed description when taken in conjunction with the accompanying drawings.

BRIEF DESCRIPTION OF THE DRAWINGS

FIG. 4 shows frequency spectrums of sounds (operation sounds) that are detected when touch operations are performed on positions on a touch panel 15;

FIG. 7 shows main data stored in a RAM 24 of the game apparatus 10;

FIG. 8 shows an example of a filter table;

DETAILED DESCRIPTION (Configuration of a Game Apparatus)

Figure 1:
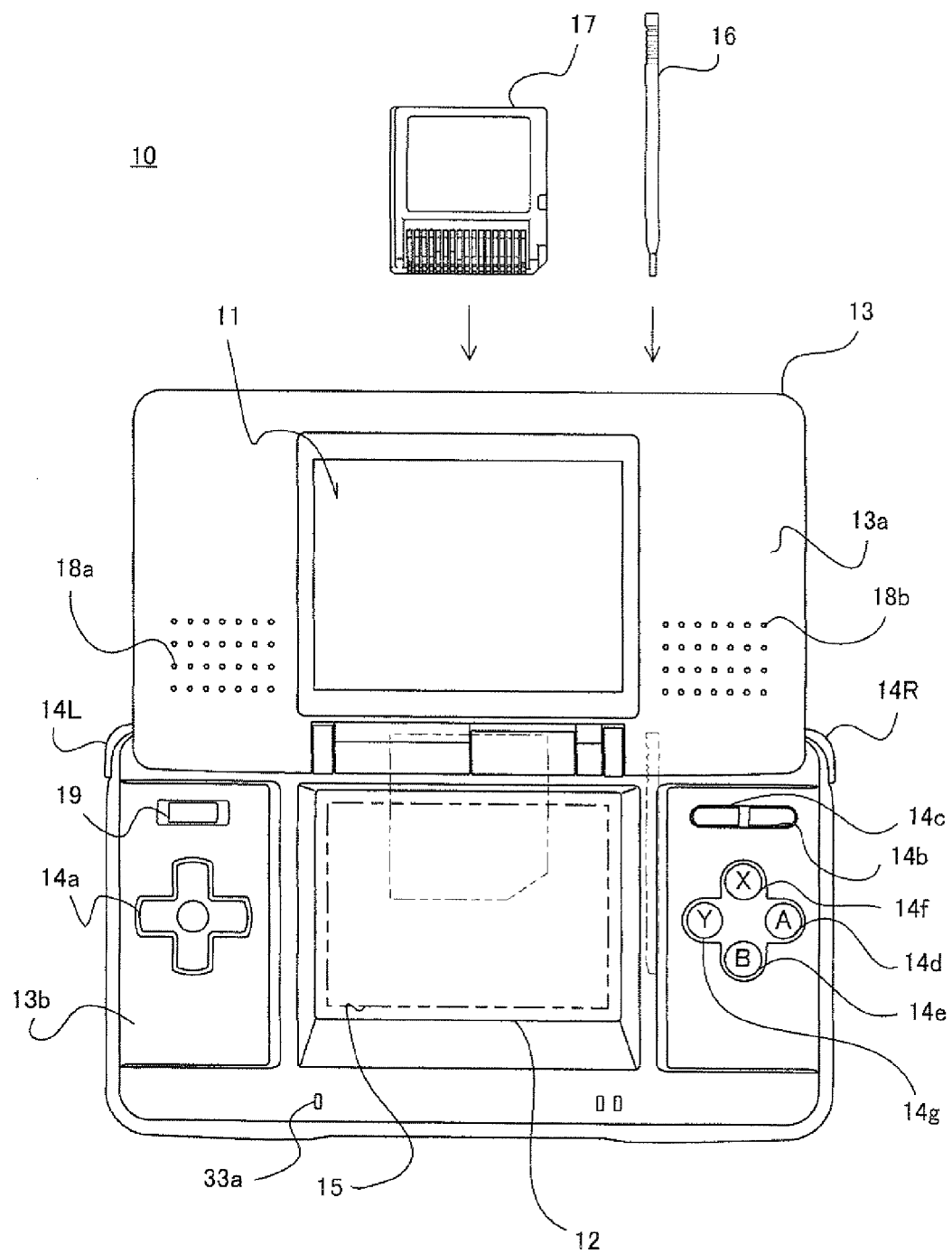
FIG. 1 is an external view of a game apparatus 10.

With reference to the drawings, a game apparatus and a game program according to an embodiment of the present invention will be described below. FIG. 1 is an external view of a game apparatus 10. In FIG. 1, the game apparatus 10 includes: a first LCD (Liquid Crystal Display) 11 and a second LCD 12 which are display devices; a housing 13; and an operation switch section 14 and a touch panel 15 which are input devices. Also, the game apparatus 10 includes loudspeakers 30a and 30b which are audio output devices (see FIG. 2), and includes a microphone 33 which is an audio input device (see FIG. 2).

A housing 13 comprises an upper housing 13a and a lower housing 13b, and the first LCD 11 is accommodated in the upper housing 13a, and the second LCD 12 is accommodated in the lower housing 13b. Resolutions of the first LCD 11 and the second LCD 12 are both 256 dots×192 dots. Note that, although LCDs are used as display devices in the present embodiment, any other display devices such as display devices using EL (Electro Luminescence) may be used, for example. Also, the resolution of the LCDs may be at any level.

The upper housing 13a is provided with sound holes 18a and 18b for outputting, to the exterior, sounds produced by a pair of loudspeakers 30a and 30b.

The lower housing 13b is provided with, as an input device, the operation switch section 14, i.e., a cross switch 14a, a start switch 14b, a select switch 14c, an "A" button 14d, a "B" button 14e, an "X" button 14f, a "Y" button 14g, an "L" button 14L, and an "R" button 14R. In addition, a transparent touch panel 15 is provided on a screen of the second LCD 12, as another input device. The lower housing 13b includes a sound hole 33a provided near the second LCD 12. The microphone 33 is provided within the lower housing 13b so as to be positioned near the sound hole 33a. The microphone 33 converts a sound, which is inputted thereto from outside of the housing 13b via the sound hole 33a, to an electrical signal (an audio signal). The lower housing 13b further includes a power switch 19 and insertion openings for storing a memory card 17 and a stick 16.

The touch panel 15 may be of any type such as a resistive film type, an optical type (infrared type), or a capacitive coupling type. The touch panel 15 has a function to output, when a surface thereof is touched with the stick 16, coordinate data which corresponds to a touched position. Though the following description is provided on an assumption that the player uses the stick 16 to operate the touch panel 15, of course the touch panel 15 may be operated using a pen (stylus pen) or a finger instead of the stick 16. The touch panel 15 used in the present embodiment has the same resolution at 256 dots×192 dots (detection accuracy) as that of the second LCD 12. However, the resolutions of the touch panel 15 and the second LCD 12 may not necessarily be consistent with each other. Although there is a type of touch panel which is capable of detecting a touch pressure, one of the modes of the present invention enables a touch panel, which is incapable of detecting a touch pressure, to detect a touch strength. However, this does not mean that a type of touch panel applicable to the present invention is limited to the one incapable of detecting a touch pressure.

The memory card 17 is a storage medium having a game program stored therein, and placed in the insertion opening provided at the lower housing 13b in a removable manner.

Figure 2:
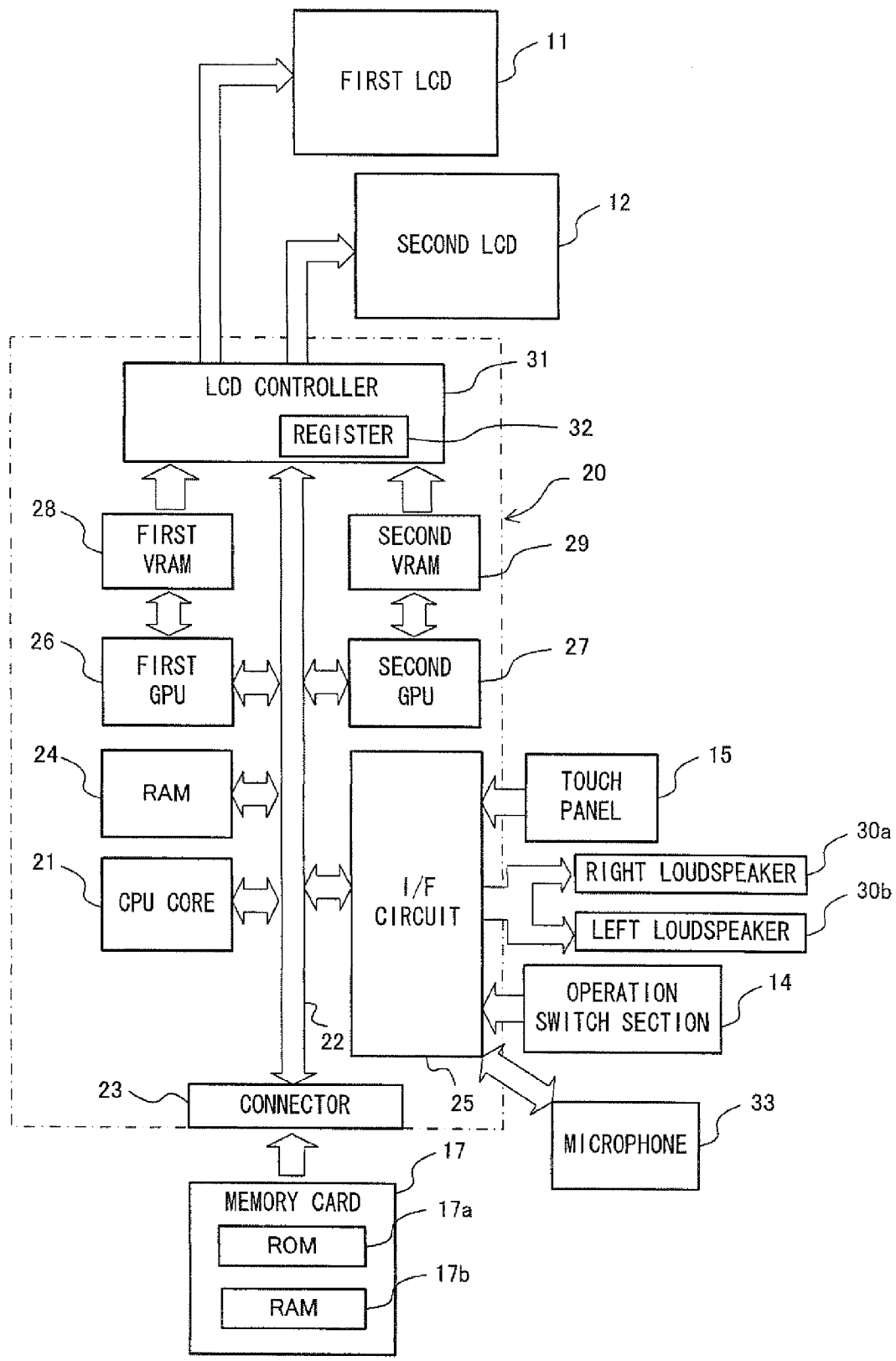
FIG. 2 shows an internal configuration of the game apparatus 10.

Next, an internal configuration of the game apparatus 10 will be described with reference to FIG. 2. In FIG. 2, a CPU core 21 is mounted on an electronic circuit board 20 which is to be housed in the housing 13. Via a bus 22, the CPU core 21 is connected to a connector 23, an input/output interface circuit (shown as an I/F circuit in the diagram) 25, a first GPU (Graphics Processing Unit) 26, a second GPU 27, a RAM 24 and an LCD controller 31. The memory card 17 is connected to the connector 23 in a removable manner. The memory card 17 includes a ROM 17a for storing a game program and a RAM 17b for storing backup data in a rewritable manner. The game program stored in the ROM 17a of the memory card 17 is loaded to the RAM 24 which is storage means of the game apparatus 10, and the game program having been loaded to the RAM 24 is executed by the CPU core 21. In addition to the game program, the RAM 24 stores, e.g., temporary data, which is obtained when the CPU core 21 executes the game program, and data for generating a game image.

Connected to the I/F circuit 25 are the operation switch section 14, the touch panel 15, the right loudspeaker 30a, the left loudspeaker 30b and the microphone 33. The right loudspeaker 30a and the left loudspeaker 30b are arranged inside the sound holes 18a and 18b, respectively. When outputting sound effects or the like of a game, the CPU core 21 outputs sound data (sound source) stored in the RAM 24 or the like, from the I/F circuit 25 to the loudspeakers 30a and 30b via an A/D conversion circuit, an amplifier and the like which are not shown. As a result, the loudspeakers 30a and 30b output sounds indicated by the sound data. Further, sound data indicating a sound inputted to the microphone 33 is stored in the RAM 24 via the I/F circuit 25.

A first VRAM (Video RAM) 28 is connected to the first GPU 26, and a second VRAM 29 is connected to the second GPU 27. In accordance with an instruction from the CPU core 21, the first GPU 26 generates a first game image based on data used for game image generation, which data is stored in the RAM 24, and writes the first game image into the first VRAM 28. Similarly, the second GPU 27 follows an instruction from the CPU core 21 to generate a second game image, and writes the second game image into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value stored in the register 32 is 0, the LCD controller 31 outputs to the first LCD 11 the first game image which has been written into the first VRAM 28, and outputs to the second LCD 12 the second game image which has been written into the second VRAM 29. When the value stored in the register 32 is 1, the first game image which has been written into the first VRAM 28 is outputted to the second LCD 12, and the second game image which has been written into the second VRAM 29 is outputted to the first LCD 11.

Note that, the above-described configuration of the game apparatus 10 is merely an example. Thus, certain example embodiments are applicable to an arbitrary information processing apparatus comprising: an input device for detecting a position, on an input plane, at which an input has been performed (e.g., a touch panel or touch pad); and a microphone. Although the microphone 33 is provided in the above-described game apparatus 10 so as to be positioned within the lower housing 13b, the microphone 33 may be provided, for example, within the upper housing 13a or positioned at a connection between the upper housing 13a and the lower housing 13b. However, in certain example embodiments, it is preferred that the input device and the microphone are fixed to the information processing apparatus. That is, it is preferred that the information processing apparatus allows the input device and the microphone to have a fixed positional relationship therebetween. In certain example embodiments, the game program can be supplied to the information processing apparatus not only by way of an external storage medium such as the memory card 17, but also by way of a wired or wireless communication path. The game program can also be stored in advance in a nonvolatile storage device provided within the information processing apparatus.

(Brief Description of Game Processing)

Figure 3:
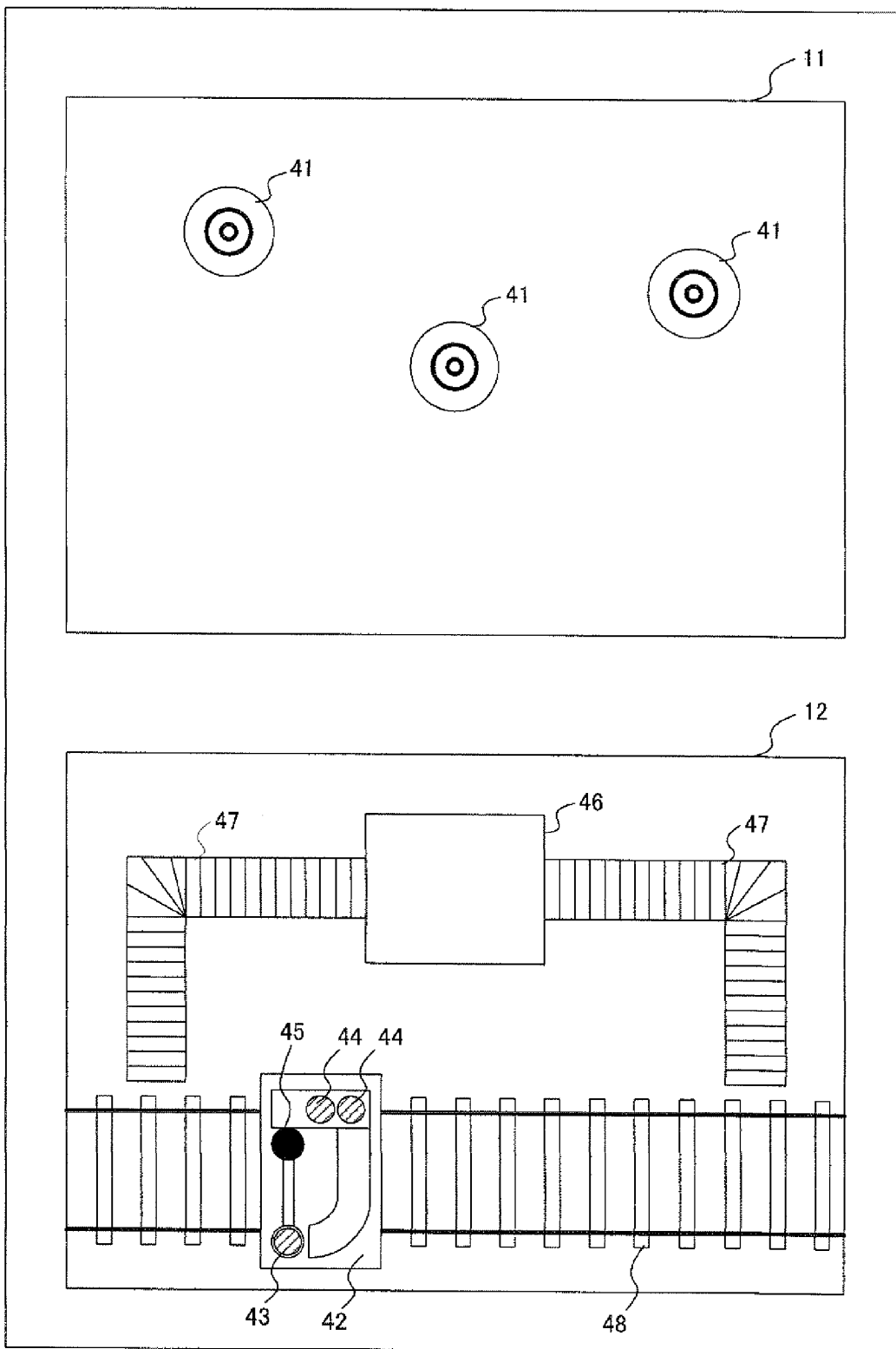
FIG. 3 shows an example of game images displayed on LCDs 11 and 12.

Hereinafter, game processing to be performed by the game apparatus 10 will be briefly described with reference to FIGS. 3 to 6. FIG. 3 shows an example of game images displayed on the LCDs 11 and 12. FIG. 3 shows that the first LCD 11 displays a game space in which targets 41 (three targets 41 in FIG. 3) are placed, and the second LCD 12 displays a game space in which a control object 42 to be controlled by a player, and the like, are placed. Note that, the game spaces displayed on the LCDs 11 and 12 are parts of a same game space, and the game space displayed on the first LCD 11 and the game space displayed on the second LCD 12 are connected. An object of this game is to fire bullets 43 from the control object 42 so as to hit the targets 41.

In this game, a player performs a touch operation on the input plane of the touch panel 15, thereby providing an instruction to the game apparatus (i.e., performing a game operation). The player performs a touch operation, thereby moving the control object 42 or firing a bullet 43 from the control object 42, for example. To be specific, when the player touches a railway 48, the control object 42 moves to a position touched by the player. Also, when the player touches a firing instruction section 45 (a black circle in FIG. 3) of the control object 42, the control object 42 fires the bullet 43 forward (i.e., to the upper screen shown in FIG. 3) (the bullet 43 displayed in the second LCD 12 gradually moves upward in FIG. 3, and when the displayed bullet 43 arrives at a top edge of the second LCD 12, the bullet 43 is displayed at a bottom edge of the first LCD 11 while a display position of the bullet is not shifted laterally. Thereafter, the displayed bullet 43 is moved further upward). In this manner, the game apparatus 10 detects a position, on the touch panel 15, on which the touch operation has been performed (hereinafter, referred to as an input position), and then controls the control object 42 in accordance with the detected input position.

In this game, in addition to detecting a position, on the touch panel 15, on which a touch operation has been performed (an input position), the game apparatus 10 detects a sound caused by the touch operation (hereinafter, referred to as an operation sound). When a touch operation is performed on the touch panel 15, a contact sound occurs as the stylus or a finger contacts the touch panel 15. In the present embodiment, this contact sound is referred to as an operation sound. The game apparatus 10 detects an operation sound via the microphone 33.

In the case where a bullet 43 is fired, a detected operation sound is used to determine a flying distance of the bullet 43. To be specific, the game apparatus 10 calculates volume of the operation sound as feature information representing a feature of the operation sound. Further, the game apparatus 10 determines the flying distance of the bullet 43 in accordance with the volume. The game apparatus 10 causes the bullet 43 to fly (move) by the determined flying distance and then land. The game apparatus 10 then determines whether or not the bullet has hit a target 41 placed anterior to the control object 42 (i.e., determines whether or not the target 41 is present on a landing point of the bullet).

As described above, in the present embodiment, the bullet 43 is fired in response to the player performing a touch operation on the firing instruction section 45, and the bullet 43 flies by a distance corresponding to the volume of the operation sound of the touch operation. In other words, by performing a touch operation once, the player can provide two instructions at the same time, i.e., an instruction to fire the bullet 43 and an instruction to determine the flying distance of the bullet 43. Thus, according to the present embodiment, an operation sound of a touch operation is detected and the operation sound is used as an instruction to the game apparatus 10. This allows the player to provide, by performing a single touch operation, more complex instructions than conventional techniques. In other words, since the player can provide two instructions based on a single touch operation, the player can perform game operations in a simpler manner than in the case of providing two instructions based on different operations.

In FIG. 3, the control object 42 has spare bullets 44 in addition to the bullet 43 fired in accordance with a firing instruction. The control object 42 can fire bullets a number of times, the number coincides with the number of bullets loaded in the control object 42. Also, in this game, the player can reload the control object 42 with bullets. To be specific, a bullet supply section 46 supplies a bullet to a supply path 47 at a predetermined timing. The supplied bullet is moved to an edge portion of the supply path 47 at the railway 48 side. The bullet may be supplied from the bullet supply section 46 in response to a touch operation performed on the bullet supply section 46. If the control object 42 is positioned at the aforementioned edge portion of the supply path 47 when a bullet arrives at the edge portion, the bullet is loaded into the control object 42. The player plays this game by firing bullets to hit the targets 41 or target objects (not shown) appearing on the first LCD 11 while reloading the bullets as described above.

Described next is a manner of calculating volume of an operation sound in the game processing. The game apparatus 10 constantly detects sounds by using the microphone 33. When a touch operation is performed, sounds which are detected by the microphone 33 at the time are obtained. In this manner, sounds, which are not operation sounds and which are detected by the microphone 33 during a period when a touch operation is not performed, are eliminated, whereby an operation sound is precisely obtained. Next, the game apparatus 10 eliminates, from the obtained sounds, other components than a frequency component of the operation sound. To be specific, a filtering process is performed for eliminating, from the obtained sounds, frequency components which are present outside of a frequency band of the operation sound. In this manner, sounds which are different from the operation sound can be eliminated from the sounds which are detected at the same time as the touch operation is performed. Finally, by calculating volume of a sound resulting from the filtering process, volume of the operation sound is obtained.

Note that, the operation sound, which occurs when a touch operation is performed, is not the same across the entire touch panel 15. The operation sound varies depending on a tapped position on the touch panel 15. The operation sound caused by a touch operation varies depending on presence, absence or types of components provided on the back of, or in the vicinity of, the touch panel. Further, there is a possibility that a mechanical structure of a central portion of the touch panel is different from that of a peripheral portion of the touch panel, which also causes the operation sound to vary. Still further, the sounds detected by the microphone 33 vary depending on the input position, based on a positional relationship between the input position and the microphone 33. This is because a distance from the input position to the microphone, a manner of reverberation of the operation sound within the housing 13, a path through which the operation sound is transmitted from the input position to the microphone 33, and the like vary depending on the input position.

FIG. 4 shows frequency spectrums of sounds (operation sounds) that are detected when touch operations are performed on positions on the touch panel 15. In FIG. 4, (a), (b), (c) and (d) show frequency spectrums of operation sounds that are detected when touch operations are performed on an upper left portion, an upper right portion, a lower left portion and a lower right portion of the touch panel 15, respectively. In each of the graphs (a) to (d) of FIG. 4, the horizontal axis represents a frequency and the vertical axis represents a level (sound intensity). In FIG. 4, w1 to w4 show ranges of frequency components constituting the operation sounds that are detected in the cases of (a), (b), (c) and (d), respectively. Sounds, which are outside of the ranges of the frequency components, are required to be removed by a filter as noise.

As shown in FIG. 4, the frequency components constituting the operation sounds in the cases of (a), (b), (c) and (d) are different from each other. For this reason, in the case where a filter, which allows a frequency component contained in a frequency band of, e.g., w2 to pass, is used, only the operation sound is precisely extracted when a touch operation is performed on the upper right portion (i.e., when the spectrum of (b) is obtained). However, in the case of using this filter, when a touch operation is performed on the lower right portion (i.e., when the spectrum of (d) is obtained), not only noise but also a part of a frequency component contained in the operation sound is removed. Meanwhile, in the case where a filter, which allows a frequency component contained in a frequency band of, e.g., w4 to pass, is used, only the operation sound is precisely extracted when a touch operation is performed on the lower right portion (i.e., when the spectrum of (d) is obtained). However, in the case of using this filter, when a touch operation is performed on the upper right portion (i.e., when the spectrum of (b) is obtained), not only the operation sound but also noise passes the filter.

As described above, when the operation sound varies depending on the input position as shown in FIG. 4, volume of the operation sound cannot be precisely calculated just by a single process. Therefore, in the present embodiment, the game apparatus 10 changes a characteristic of the filter used in the filtering process, in accordance with the input position.

Figure 5:
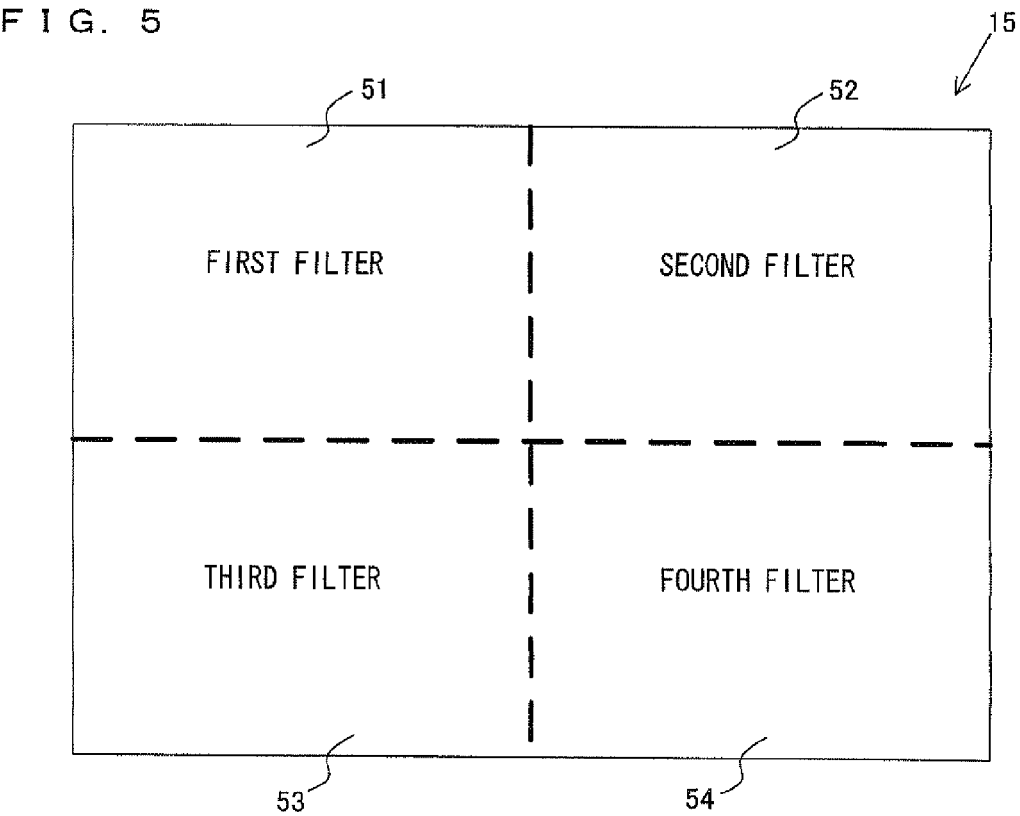
FIG. 5 shows an example of a correspondence relationship between areas of the touch panel 15 and filters to be used in the areas.

FIG. 5 shows an example of a correspondence relationship between areas of the touch panel 15 and filters to be used in the areas. In the present embodiment, the game apparatus 10 takes the detection results shown in FIG. 4 into account, and separately uses four filters having different passbands from each other (first to fourth filters), depending on the input position. The first filter has, as a frequency passband thereof, the frequency band w1 which is obtained when the input position is on the upper left portion. Similarly, the second filter has, as a frequency passband thereof, the frequency band w2 which is obtained when the input position is on the upper right portion; the third filter has, as a frequency passband thereof, the frequency band w3 which is obtained when the input position is on the lower left portion; and the fourth filter has, as a frequency passband thereof, the frequency band w4 which is obtained when the input position is on the lower right portion.

Further, as shown in FIG. 5, the touch panel 15 are divided into four areas, i.e., an upper left area 51, an upper right area 52, a lower left area 53 and a lower right area 54. The upper left area 51 is associated with the first filter; the upper right area 52 is associated with the second filter; the lower left area 53 is associated with the third filter; and the lower right area 54 is associated with the fourth filter. As a result, when the input position is on the upper left area 51, the first filter is used; when the input position is on the upper right area 52, the second filter is used; when the input position is on the lower left area 53, the third filter is used; and when the input position is on the lower right area 54, the fourth filter is used. By separately using the respective filters in accordance with the correspondence relationship shown in FIG. 5, the filtering process can be performed using a suitable filter even in the case where the frequency component of the operation sound varies depending on the input position. Accordingly, sounds other than the operation sound can be precisely removed, and the volume of the operation sound can be precisely calculated.

Figure 6:
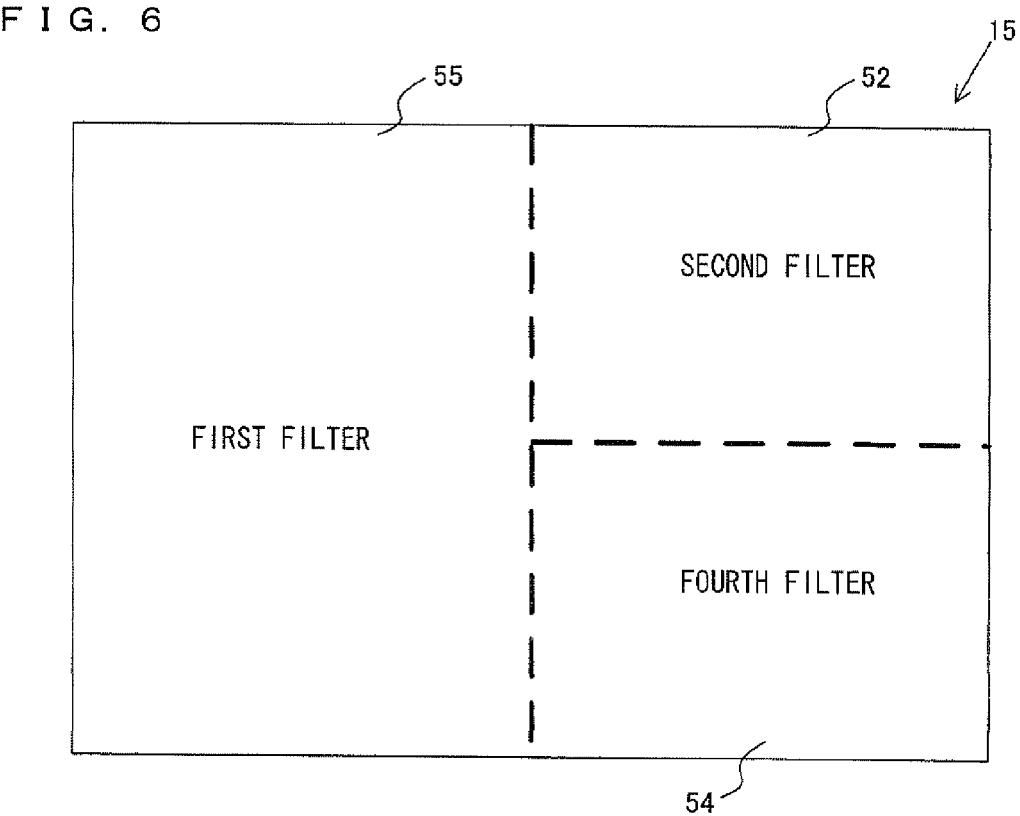
FIG. 6 shows another example of the correspondence relationship between areas of the touch panel 15 and filters to be used in the areas.

Note that, since the frequency band w1 in the case where the input position is on the upper left area 51 of the touch panel 15 and the frequency band w3 in the case where the input position is on the lower left area 53 of the touch panel 15, are almost the same, the first filter may be used also for the lower left area 53. FIG. 6 shows another example of a correspondence relationship between areas of the touch panel 15 and filters to be used in the areas. In FIG. 6, the upper left area 51 and the lower left area 53 are combined to be a left area 55. Here, the upper right area 52 is associated with the second filter; the lower right area 54 is associated with the fourth filter; and the left area 55 is associated with the first filter. In other embodiments, the correspondence relationship shown in FIG. 6 may be used so as to use the same filter in both a case where the input position is on the upper left portion and a case where the input position is on the lower left portion.

Although the present embodiment describes an example of a case where the input plane of the touch panel 15 is divided into four areas, a manner of dividing the input plane may be determined as appropriately in accordance with a configuration of the game apparatus. For example, the input plane may be divided into five areas, i.e., an upper left area, an upper right area, a lower left area, a lower right area and a central area.

(Detailed Description of the Game Processing)

Hereinafter, the game processing performed by the game apparatus 10 will be described in detail with reference to FIGS. 7 to 12. First, data to be used in the game processing will be described with reference to FIGS. 7 and 8. FIG. 7 shows main data stored in the RAM 24 of the game apparatus 10. As shown in FIG. 7, the RAM 24 stores a game program 60, input position data 61, detected sound data 62, game processing data 63 and the like. In addition to the data shown in FIG. 7, the RAM 24 stores operation data indicating an operation state of the operation switch section 14, image data of various objects appearing in a game space, sound data of game sounds outputted during the game (sound effects, BGM and the like), and the like.

Figure 9:
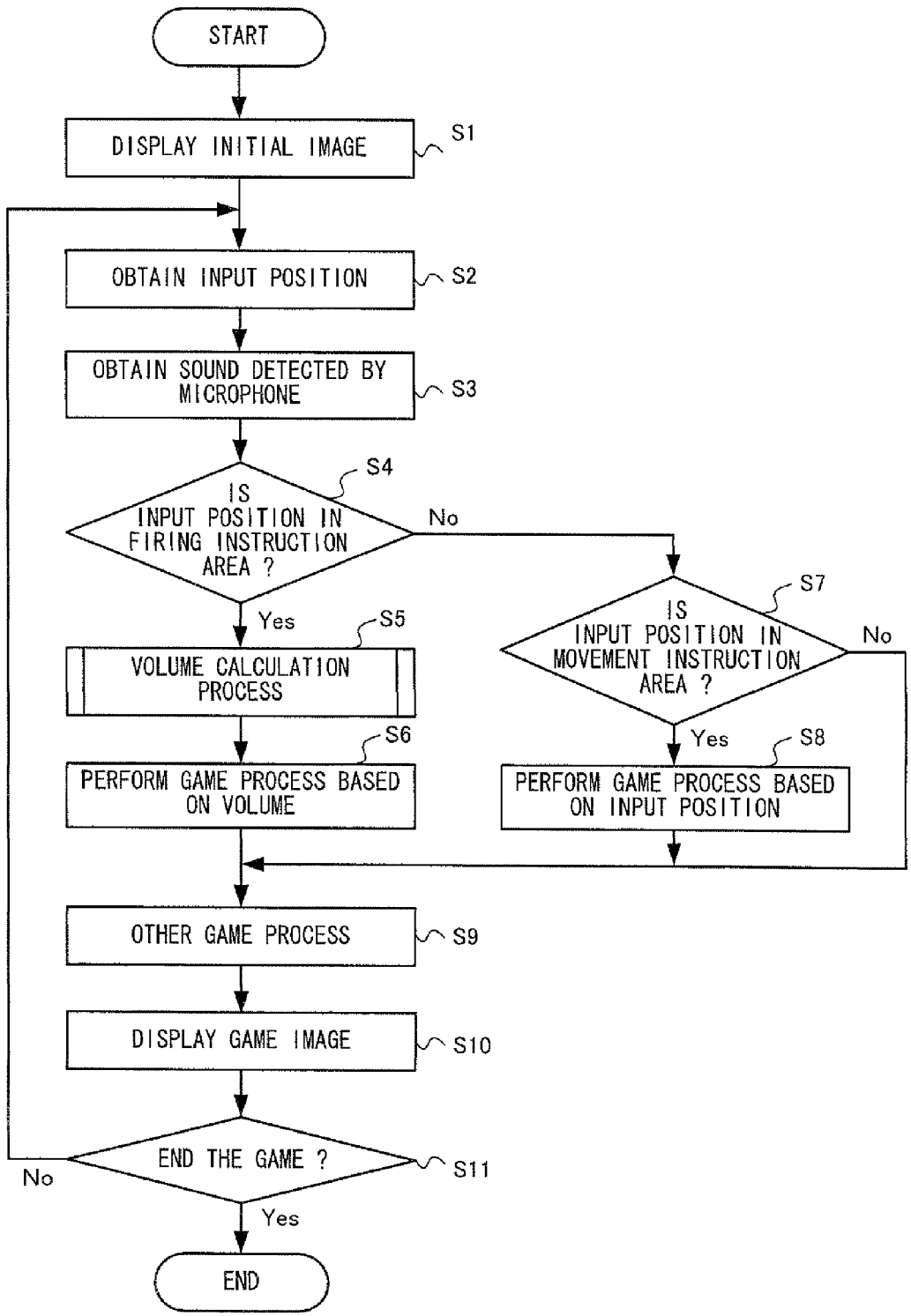
FIG. 9 is a flowchart showing a sequence of game processing performed by the game apparatus 10.

The game program 60 is a program for performing the game processing. The game program 60 is partly or entirely read from the ROM 17*a* of the memory card 17 at an appropriate timing, and then stored in the RAM 24. Processing shown in a flowchart of FIG. 9 is performed as a result of the CPU core 21 executing the game program 60.

The input position data 61 indicates an input position, on the touch panel 15, on which a touch operation has been performed. To be specific, the input position data 61 indicates coordinate values on a two-dimensional coordinate system (xy coordinate system) set on the input plane of the touch panel 15. The game apparatus 10 obtains, once in each predetermined time interval (e.g., once in each frame time), data indicating the input position detected by the touch panel 15, and stores the data in the RAM 24 as the input position data 61. Note that, when there is no input performed on the touch panel 15, data indicating the absence of an input is obtained from the touch panel 15, and the data is stored in the RAM 24 as the input position data 61. In the present embodiment, the game apparatus 10 stores, as the input position data 61, at least two pieces of data which are most recently sequentially obtained (i.e., most recently obtained input position data and input position data obtained immediately prior to the most recently obtained input position data).

The detected sound data 62 indicates sounds detected by the microphone 33 (detected sounds). The game apparatus 10 obtains, once in each predetermined time interval (each predetermined time interval is preferred to be equal or shorter than the aforementioned time interval for obtaining an input position, e.g., one frame time), sound data (sound signals) detected by the microphone 33, and stores the sound data in the RAM 24 as the detected sound data 62. Note that, the detected sound data 62 obtained at one time is sound data which is detected by the microphone 33 within a predetermined time period which is set with reference to a time point when the sound data starts to be obtained. In the present embodiment, the game apparatus 10 stores, in the RAM 24 as the detected sound data 62, data which is obtained in a most-recent frame time.

The game processing data 63 is used in the game processing. The game processing data 63 contains filter table data 64, to-be-used filter data 65, processed sound data 66, volume data 67, flying distance data 68, object position data 69, firing instruction area data 70, movement instruction area data 71 and the like. Note that, in addition to the data shown in FIG. 7, various data necessary for performing the game processing, e.g., data of filters to be used in the filtering process (i.e., the first, second, third and fourth filters), is stored as the game processing data 63. Note that, the filter table data 64 and the data of the filters are stored in the memory card 17. These data are read from the memory card 17 and then stored in the RAM 24 at an appropriate timing, e.g., at the start of the game.

The filter table data 64 indicates a filter table which shows associations between the areas, into which the input plane of the touch panel 15 is divided, and the filters. FIG. 8 shows an example of the filter table. As shown in FIG. 8, the filter table associates each of two or more areas set on the touch panel 15 with a filter which is to be used when the input position is in said each of the two or more areas. The filter table shown in FIG. 8 represents the correspondence relationship shown in FIG. 5. To be specific, in the filter table shown in FIG. 8, the upper left area 51 set on the touch panel 15 is associated with the first filter. Similarly, the upper right area 52 is associated with the second filter; the lower left area 53 is associated with the third filter; and the lower right area 54 is associated with the fourth filter. Note that, in the present embodiment, data which associates the areas on the touch panel 15 with the filters is stored in the form of a table. However, in other embodiments, the data may be in any form.

The to-be-used filter data 65 indicates a filter to be used in the filtering process that is performed for calculating volume of an operation sound (hereinafter, referred to as a to-be-used filter). In the present embodiment, the to-be-used filter is any of the above first, second, third and the fourth filters. Therefore, the to-be-used filter data 65 contains data which indicates any of the first, second, third and the fourth filters. In other embodiments, the to-be-used filter data 65 may be any data as long as the data allows a filter characteristic of the to-be-used filter to be specified. For example, the to-be-used filter data 65 may indicate a frequency passband or the like of the to-be-used filter.

The processed sound data 66 shows a result of the filtering process performed on the aforementioned detected sounds (i.e., performed on a spectrum of the detected sounds). The processed sound data 66 is data of a sound that is a result of removing noise components from the detected sounds (i.e., a result of removing sound components other than the operation sound). The volume data 67 indicates the volume of the operation sound. In the present embodiment, the volume data 67 indicates the volume of the sound indicated by the processed sound data 66.

The flying distance data 68 indicates a flying distance of a bullet 43 fired from the control object 42. The flying distance is calculated based on the volume (volume data 67) of the operation sound. Also, the object position data 69 indicates a position of the control object 42 in the game space. A display position of the control object 42 is calculated based on the input position.

The firing instruction area data 70 indicates an area which is on the input plane of the touch panel 15 and in which an instruction to fire the bullet 43 can be provided to the control object 42 (a firing instruction area). In the present embodiment, the firing instruction area is an area, on the screen, in which the firing instruction section 45 of the control object 42 is displayed. Accordingly, since the firing instruction area is moved in accordance with a movement of the control object 42, the firing instruction area data 70 is updated when the object position data 69 is updated. Further, the movement instruction area data 71 indicates an area which is on the input plane of the touch panel 15 and in which an instruction to move the control object 42 can be provided (a movement instruction area). In the present embodiment, the movement instruction area is an area, on the screen, in which the railway 48 is displayed. In the game processing, the movement instruction area is set fixedly. The movement instruction area data 71 is stored in the RAM 24 at the start of the game. Similarly to the input position, the firing instruction area data 70 and the movement instruction area data 71 are represented in coordinate values of the xy coordinate system.

Next, the game processing performed by the game apparatus 10 will be described in detail with reference to FIGS. 9 and 10. FIG. 9 is a flowchart showing a sequence of the game processing performed by the game apparatus 10. When power is supplied to the game apparatus 10, the CPU core 21 of the game apparatus 10 executes a boot program stored in a boot ROM (not shown) to initialize each unit such as the RAM 24. Then, the game program stored in the memory card 17 is loaded to the RAM 24, and the CPU core 21 starts executing the game program. The flowchart shown in FIG. 9 shows the game processing which is performed after the above process is completed.

At step S1 shown in FIG. 9, the CPU core 21 displays an initial image of the game. To be specific, the CPU core 21 places the control object 42, a target 41 and the like in predetermined initial positions in a game space, and generates an image of the game space in which the control object 42, the target 41 and the like are placed. The CPU core 21 causes the LCDs 11 and 12 to display the image. Data indicating the initial position of the control object 42 is stored in the RAM 24 as the object position data 69. Also, the RAM 24 stores, as the firing instruction area data 70, data indicating an area in which the firing instruction section 45 is positioned and which is determined in accordance with the position of the control object 42. After step S1, a process at step S2 is performed. After step S1, a loop of processes at steps S2 to S10 is reiterated until the game processing shown in FIG. 9 ends. The loop of processes is performed once in each frame time (every 1/60 sec).

At step S2, the CPU core 21 obtains an input position from the touch panel 15. To be specific, the CPU core 21 obtains data indicating the input position detected by the touch panel 15, and stores the data in the RAM 24 as most recently obtained input position data 61. After step S2, a process at step S3 is performed.

At step S3, the CPU core 21 obtains sounds detected by the microphone 33. To be specific, the CPU core 21 obtains data of the sounds detected by the microphone 33, and stores the data in the RAM 24 as the detected sound data 62. When a touch operation is performed, an operation sound can be obtained from the microphone 33 by performing the process at step S3. After step S3, a process at step S4 is performed.

At step S4, the CPU core 21 determines, based on the input position data 61 (the most recently obtained input position data and input position data obtained immediately prior to the most recently obtained input position data), whether or not a state of the touch panel has changed from a state of being untouched, i.e., a touch-off state, to a state of being touched, i.e., a touch-on state, and whether or not the most recently obtained input position data indicates a position present within the firing instruction area. Such a determination process at step S4 is performed for the purpose of determining whether or not the player has performed a touch-on operation (i.e., an operation to cause the state of the touch panel to change from the touch-off state to the touch-on state) on the firing instruction area (the firing instruction section 45). To be specific, the CPU core 21 first determines whether or not the state of the touch panel has changed from the touch-off state to the touch-on state. To be more specific, the CPU core 21 determines whether or not the most recently obtained input position data contained in the input position data 61 stored in the RAM 24 indicates an input position, and the input position data, which is obtained immediately prior to the most recently obtained input position data and which is contained in the input position data 61, indicates no input position (a first determination process). When a result of the first determination process is negative, a result of the determination at step S4 is determined to be negative. On the other hand, when the result of the first determination process is positive, the CPU core 21 determines whether or not the most recently obtained input position data indicates a position present within the firing instruction area (a second determination process). In the second determination process, it is determined whether or not the input position indicated by the most recently obtained input position data and a display position of the firing instruction section 45 are in a predetermined relationship, that is, whether or not the input position and the display position are distant from each other by a predetermined distance or shorter. To be specific, the CPU core 21 determines whether or not the most recently obtained input position data indicates a position present within an area indicated by the firing instruction area data 70. When a result of the second determination process is negative, the result of the determination at step S4 is determined to be negative. On the other hand, when the result of the second determination process is positive, the result of the determination at step S4 is determined to be positive. When the result of the determination at step S4 is positive, processes at steps S5 and S6 are performed. On the other hand, when the result of the determination at step S4 is negative, later-described processes at steps S7 and S8 are performed.

The processes at steps S5 and S6 are game processes using the operation sound of the touch operation. To be specific, volume of the operation sound is calculated (step S5), and a flying distance of a bullet 43 is determined in accordance with the calculated volume (step S6). Steps 5 and 6 are described below in detail.

At step S5, the CPU core 21 performs a volume calculation process for calculating the volume of the operation sound. Hereinafter, the volume calculation process will be described in detail with reference to FIG. 10.

Figure 10:
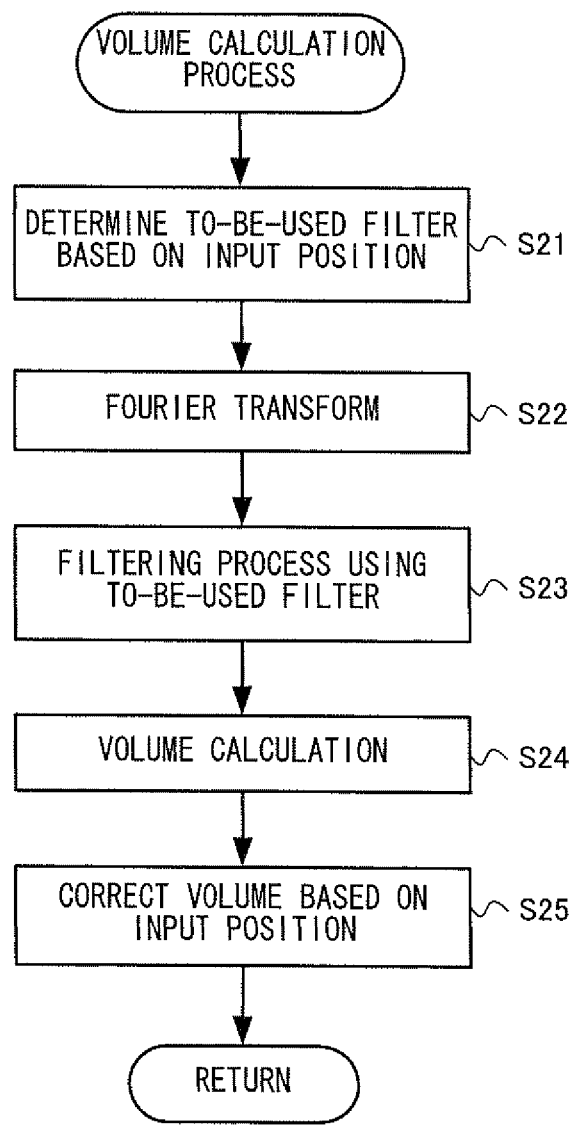
FIG. 10 is a flowchart showing, in detail, a volume calculation process (step S5) shown in FIG. 9.

FIG. 10 is a flowchart showing, in detail, the volume calculation process (step S5) shown in FIG. 9. In the volume calculation process, at step S21, the CPU core 21 first determines, based on the input position, a filter to be used at the filtering process (S23) which is later described (i.e., determines a to-be-used filter). The to-be-used filter is determined by referring to the filter table indicated by the filter table data 64 stored in the RAM 24. To be specific, the CPU core 21 reads the input position data 61 and the filter table data 64, and specifies, among the areas set in the filter table, an area including the input position indicated by the input position data 61. Then, a filter associated with the specified area is determined to be the to-be-used filter. Data indicating the determined to-be-used filter is stored in the RAM 24 as the to-be-used filter data 65. After step S21, a process at step S22 is performed.

At step S22, the CPU core 21 performs a Fourier transform (to be specific, FFT (Fast Fourier Transform)) on the detected sounds. As a result, sound signals of the detected sounds are converted to a frequency spectrum. After step S22, a process at step S23 is performed. Note that, in other embodiments, the Fourier transform processing is not necessarily performed. The later-described filtering process may be performed on sound data on which the Fourier transform has not been performed.

At step S23, the CPU core 21 performs the filtering process on the frequency spectrum obtained at step S22. In this filtering process, the CPU core 21 uses the to-be-used filter determined at step S21, i.e., a filter specified by the to-be-used filter data 65 stored in the RAM 24. In the filtering process, components which are present outside of a passband of the filter are removed from the frequency spectrum obtained at step S22. As a result, components of the detected sounds, which are present outside of a frequency band of the operation sound, are removed, whereby the operation sound is obtained more precisely. Data indicating the frequency spectrum that is obtained after the filtering process is performed, is stored in the RAM 24 as the processed sound data 66. After step S23, a process at step S24 is performed.

At step S24, the CPU core 21 calculates the volume of the operation sound. The processed sound data 66 stored in the RAM 24 is used for the volume calculation. For example, the CPU core 21 performs an inverse Furier transform (to be specific, inverse FFT) on the frequency spectrum indicated by the processed sound data 66. The volume of the operation sound is calculated from an amplitude of a sound signal obtained by the inverse Furier transform. In other embodiments, the volume may be calculated by performing integration on the frequency spectrum indicated by the processed sound data 66. Data indicating the calculated volume is stored in the RAM 24 as the volume data 67. After step S24, a process at step S25 is performed.

At step S25, the CPU core 21 corrects, based on the input position, the volume calculated at step S24. In the present embodiment, the volume is corrected based on a distance between the position of the microphone 33 and the input position. To be specific, the volume is corrected such that a value to be added to a value of the volume is increased in accordance with an increase in the distance. To be specific, the CPU core 21 calculates, based on the input position indicated by the input position data 61 stored in the RAM 24, a distance between the microphone 33 and the input position. Note that, since the positions, in the housing 13, of the touch panel 15 and the microphone 33 are predetermined, the distance can be calculated based on the input position. Next, based on the calculated distance, the CPU core 21 corrects the value of the volume indicated by the volume data 67 stored in the RAM 24, such that a value to be added to the value of the volume increases in accordance with an increase in the distance. The volume data 67 is updated so as to indicate the volume on which the correction has been performed. In other words, data indicating the corrected volume is newly stored in the RAM 24 as the volume data 67. After the above step S25 is completed, the CPU core 21 ends the volume calculation process.

As described above, in the present embodiment, the volume of the operation sound is corrected based on the input position at step S25. In the case where the distance between the microphone 33 and the input position is long, the operation sound detected by the microphone 33 is smaller than in the case where the distance is short. Therefore, even if an actual volume of the operation sound is the same in both the case where the distance is long and the case where the distance is short, the volume obtained from the volume calculation may be different between these cases. However, according to the process at the above step S25, the correction is performed such that the value of the volume is increased in the case where the distance is long, whereby the difference in the volume obtained from the volume calculation between the case where the distance is long and the case where the distance is short is compensated for. In this manner, the volume can be more precisely calculated.

In other embodiments, the volume may be corrected at step S25 without calculating the above distance. For example, the game apparatus 10 may prestore, in the RAM 24, data associating the areas shown in FIG. 5 with correction amounts, and a correction amount may be determined by referring to the data.

Further, in the present embodiment, the game apparatus 10 takes into account that the frequency component of the operation sound varies depending on the input position, and uses the different filters for the respective input positions (step S23). The game apparatus 10 also takes into account that volume of the sounds detected by the microphone 33 varies depending on the input position, and corrects, based on the input position, volume that has been calculated as the volume of the operation sound (step S25). Here, in the present embodiment, the CPU core 21 may only perform either one of the process at step S23 or the process at step S25. Further, instead of performing the process at step S25, the CPU core 21 may perform, at step S23, correction of the volume in accordance with the input position. To be specific, at step S23, a gain of the to-be-used filter may be determined based on the input position. For example, in the case where the input position is in a distant area from the microphone 33, the gain of the to-be-used filter is set to be greater than in the case where the input position is in a close area to the microphone 33. This produces the same effect as that obtained by correcting the volume at step S25. Still further, in the case of setting the gain of the to-be-used filter, the gain may be set such that the gain is greater only for a particular frequency band in the passband (i.e., the gain is weighted).

Return to FIG. 9. At step S6 after step S5, the CPU core 21 performs a game process based on the volume calculated at step S5. In the present embodiment, a process, in which the control object 42 fires a bullet 43 by a flying distance corresponding to the volume, is performed as the game process based on the volume. To be specific, the CPU core 21 calculates the flying distance of the bullet 43 in accordance with the volume indicated by the volume data stored in the RAM 24. The flying distance of the bullet 43 is calculated such that the greater the volume, the longer is the flying distance. Data indicating the calculated flying distance is stored in the RAM 24 as the flying distance data 68. After the flying distance is calculated, the CPU core 21 causes the control object 42 to perform a firing action so as to fire the bullet 43 by the flying distance indicated by the flying distance data 68 stored in the RAM 24. After the above step S6, a process at later-described step S9 is performed.

Meanwhile, processes at steps S7 and S8 are game processes using the input position of the touch operation. Performed at steps S7 and S8 are processes for determining the position of the control object 42 in accordance with the input position. Hereinafter, steps S7 and S8 are described in detail.

At step S7, the CPU core 21 determines whether or not the input position obtained at step S2 is within the movement instruction area. Such a determination process at step S7 is performed for the purpose of determining whether or not the player has performed a touch operation on the movement instruction area (the railway 48). To be specific, the CPU core 21 determines whether or not a position indicated by the input position data 61 stored in the RAM 24 is within an area indicated by the movement instruction area data 71. When a result of the determination at step S7 is positive, the process at step S8 is performed. On the other hand, when the result of the determination at step S7 is negative, the process at step S8 is skipped, and a process at later-described step S9 is performed.

At step S8, the CPU core 21 performs a game process based on the input position. In the present embodiment, a process for moving the control object 42 in accordance with the input position is performed as the game process based on the input position. To be specific, the CPU core 21 determines the position of the control object 42 such that on the screen of the second LCD 12, the position of the control object 42 coincides laterally with the input position indicated by the input position data 61 stored in the RAM 24. Data indicating the determined position is stored in the RAM 24 as the object position data 69. Note that, details of the process for moving the control object 42 in accordance with the input position may be various. For example, an upper limit may be set for a moving amount of the control object 42 per frame time. After the above step S8, the process at step S9 is performed.

At step S9, the CPU core 21 performs different game processes from the game processes performed at steps S6 and S8. The game processes performed at step S9 are, for example, a process for moving the bullet which has been fired, a process for determining whether or not the bullet has hit the target 41, and a process for causing the target 41 to disappear when the bullet has hit the target 41. Alternatively, the processes may be a process in which the bullet supply section 46 supplies bullets and a process for moving the target 41 or a target object. After step S9, a process at step S10 is performed.

At step S10, the CPU core 21 displays a game image. To be specific, when the process at step S6 has been performed in the currently performed loop of processes, a game image, which shows the control object 42 firing the bullet 43, is generated and displayed. Also, when the process at step S8 has been performed in the currently performed loop of processes, a game image, which shows the game space in which the control object 42 is placed at a position indicated by the object position data 69 stored in the RAM 24, is generated and displayed. After step S10, a process at step S11 is performed.

At step S11, the CPU core 21 determines whether or not to end the game. The determination at step S11 is performed, for example, based on whether or not the player has given an instruction to end the game, or whether or not the player has conquered the game (i.e., whether or not all the targets 41 have disappeared). When a result of the determination at step S11 is negative, the process at step S2 is performed again. On the other hand, when the result of the determination at step S11 is positive, the CPU core 21 ends the game processing shown in FIG. 9.

As described above, according to the present embodiment, when the player performs a touch operation on the firing instruction section 45 (Yes at step S4), the volume of the operation sound caused by the touch operation is calculated (step S5). Then, the control object 42 performs an action to fire the bullet 43 by the flying distance corresponding to the volume (step S6). Accordingly, by performing a single touch operation, the player can provide an instruction to cause the control object 42 to fire the bullet 43 and an instruction to determine the flying distance of the bullet 43. Thus, in the present embodiment, detecting the operation sound of the touch operation and performing the game processing based on the operation sound allows the player to provide, by a single touch operation, more complex instructions as compared to conventional techniques.

Further, in the present embodiment, when the volume of the operation sound, which is to be used in the game processing, is calculated, details of the process for calculating the volume are modified in accordance with the input position so that the performed process may be appropriate. To be specific, in the calculation of the volume of the operation sound, the filtering process is performed such that the different filters having different passbands from each other are used depending on the input position (steps S21 and S23), and the volume is corrected in a manner corresponding to the input position (step S25). According to the above-described processes at steps S21 and S23, even if the frequency band of the operation sound varies depending on the input position, the filtering process can be performed appropriately based on the input position. Therefore, noise can be properly removed by the filtering process. Still further, according to the process at step S25, even if the volume of the operation sound, which is detected by the microphone 33, varies depending on the input position, the volume can be precisely calculated by correcting the volume in accordance with the input position. Thus, according to the present embodiment, the volume can be precisely calculated by modifying, based on the input position, the details of the process for calculating the volume.

Further, in the present embodiment, the filtering process is performed on the detected operation sound as arithmetic processing based on the input position. However, in other embodiments, the arithmetic processing is not limited to the filtering process. For example, the arithmetic processing may be processing for amplifying (or attenuating) a signal of the operation sound. In this case, at step S21, the CPU core 21 determines, based on the input position, an amplification rate for amplifying the signal of the operation sound. The amplification rate can be determined by preparing, in the RAM 24, not the above-described filter table but data associating the areas on the input plane with amplification rates, and by referring to the data. Preferably, the amplification rate is determined such that the longer the distance from the microphone to the input position, the greater the amplification rate (i.e., the more amplified the signal of the operation sound). Then, at step S23, the CPU core 21 amplifies the signal of the operation sound by the amplification rate determined at step S21. This allows the volume to be precisely calculated by taking into account the distance between the microphone and the input position. Note that, in this case, it is not necessary to perform the process at step S22.

In the present embodiment, the arithmetic processing (filtering process) is performed on the detected operation sound in a manner corresponding to the input position, and feature information calculated based on the operation sound is corrected in accordance with the input position. However, in other embodiments, whether or not the detected operation sound satisfies a predetermined standard may be determined. In the case where a predetermined game process is performed when the detected operation sound satisfies the predetermined standard, a reference for the determination may be changed in accordance with the input position while no change is made on the operation sound and the feature information. For example, in the case where a degree of similarity between a waveform of the detected operation sound and a reference waveform is determined, and a predetermined game process is performed when the waveform of the detected operation sound is determined to be similar to the reference waveform, the reference waveform may be changed based on the input position. To be specific, reference waveforms are prestored for the respective areas shown in FIG. 5, and a reference waveform is selected therefrom by determining which area includes the input position. Then, the degree of similarity may be determined by using the selected reference waveform. Further, in the case where it is determined whether or not the calculated volume data is no smaller than a reference value, and a predetermined game process is performed when the volume data is determined to be no smaller (or greater) than the reference value, the reference value may be changed based on the input position. To be specific, reference values may be prestored for the respective areas shown in FIG. 5, and a reference value is selected therefrom by determining which area includes the input position. Then, whether or not the calculated volume data is no smaller than the reference value is determined using the selected reference value.

Still further, in the present embodiment, it is determined at step S4 whether or not a touch-on operation has been performed. However, not only whether or not a touch-on operation has been performed but also whether or not another predetermined operation (e.g., a sliding operation or a multiple-tapping operation) has been performed may be determined. In this case, input position data for a few frames is stored as the input position data 61, and at step S4, whether or not any of these predetermined operations has been performed may be determined from a history of input positions.

Still further, in the present embodiment, sound data obtained in the most recent frame time is stored as the detected sound data 62 at step S3. However, sound data obtained for a few frame times may be stored as the detected sound data 62. In this case, when a determination "Yes" is made at step S4, the processing does not immediately proceed to step S5. Sound data obtained for a predetermined number of frame times from this point is stored as the detected sound data 62, and the entire detected sound data 62 may be used at step S5. As a result, the operation sound, which is more precisely obtained, can be used in the game processing.

(Exemplary Variation for Setting of the Filter Table)

In the above embodiment, the filter table, which is used to determine the to-be-used filter, is prepared in advance. However, in other embodiments, the filter table may be created (or the filter table prepared in advance may be corrected) by instructing the player to perform a touch operation before the game starts. Hereinafter, an exemplary variation of the present embodiment, in which the filter table is created before the game starts, will be described.

First, a manner of creating the filter table in this exemplary variation will be briefly described. Similarly to the above-described embodiment, the input plane of the touch panel 15 is divided into the upper left area 51, the upper right area 52, the lower left area 53 and the lower right area 54 (see FIG. 5). Described here is an example of a case where the areas 51 to 54 are respectively associated with filters.

In this exemplary variation, the game apparatus 10 instructs the player to perform a touch operation before the game starts. Then, the operation sound of the touch operation is detected. Thereafter, a filter characteristic of a filter to be associated with an area on which the touch operation has been performed, is determined based on the detected operation sound. This allows the area to be associated with the filter to be used for the operation sound of the touch operation performed in the area. By associating the areas 51 to 54 with filters in this manner, the filter table, which shows associations between the areas 51 to 54 and the filters, can be created. In this exemplary variation, the filter table is created in this manner before the game starts, and the game processing is performed during the game by using the created filter table. Hereinafter, processing performed in this exemplary variation will be described in detail.

Figure 11:
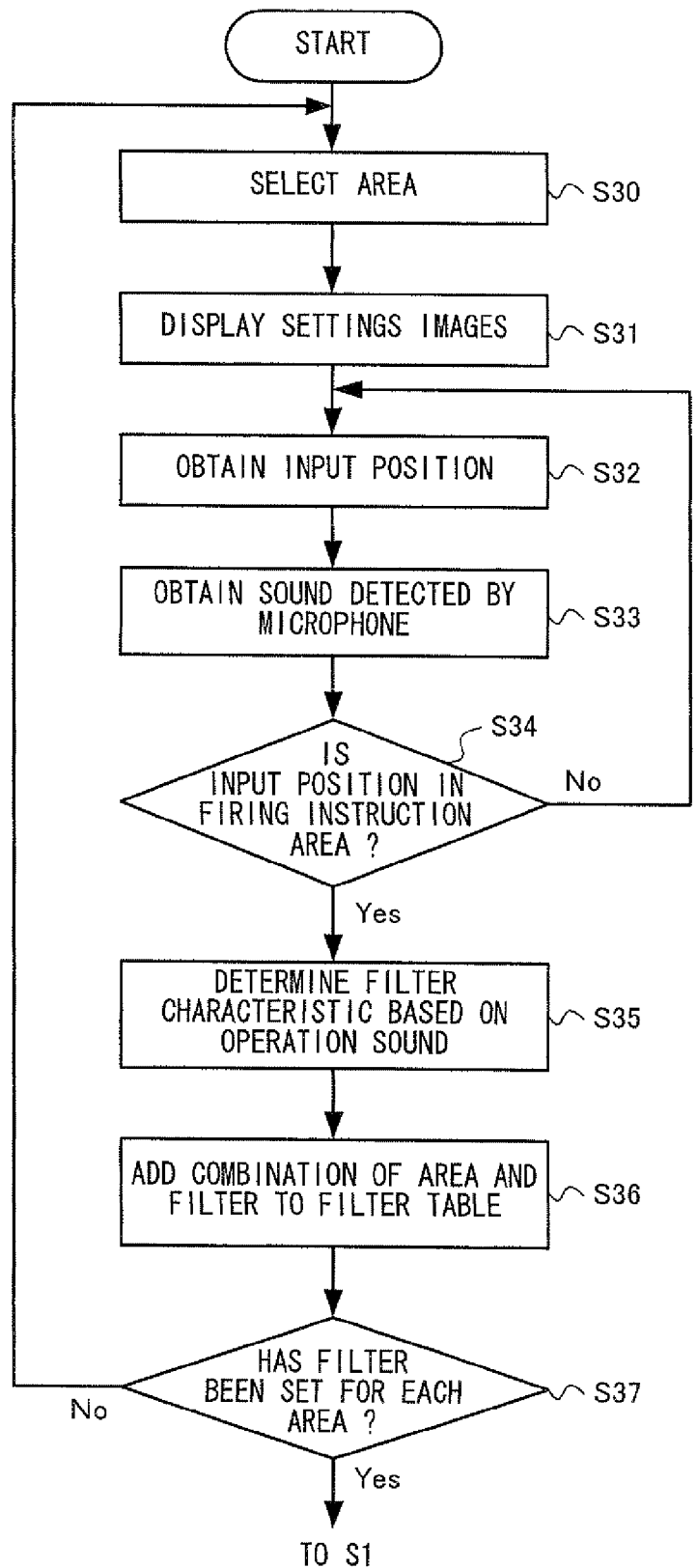
FIG. 11 is a flowchart showing a sequence of processing in an exemplary variation of the game processing shown in FIG. 9.

FIG. 11 is a flowchart showing a sequence of processing in the exemplary variation of the game processing shown in FIG. 9. In this exemplary variation, when the game processing shown in FIG. 9 starts, processes at steps S31 to 37 shown in FIG. 11 are performed first. Thereafter, the processes are performed from step S1. Since the processes from step S1 in this exemplary variation are the same as those shown in FIG. 9, the processes from step S1 are omitted in FIG. 11.

In FIG. 11, at step S30, the CPU core 21 randomly selects one of the areas 51 to 54 set on the input plane of the touch panel 15. Here, one of the areas is selected such that an area, which has already been selected by a previously performed process at step S30, is not selected. After step S30, a process at step S31 is performed. At the above-described step S30, one of the areas 51 to 54 is randomly selected. In other embodiments, however, one of the areas may be selected in accordance with a predetermined order.

Figure 12:
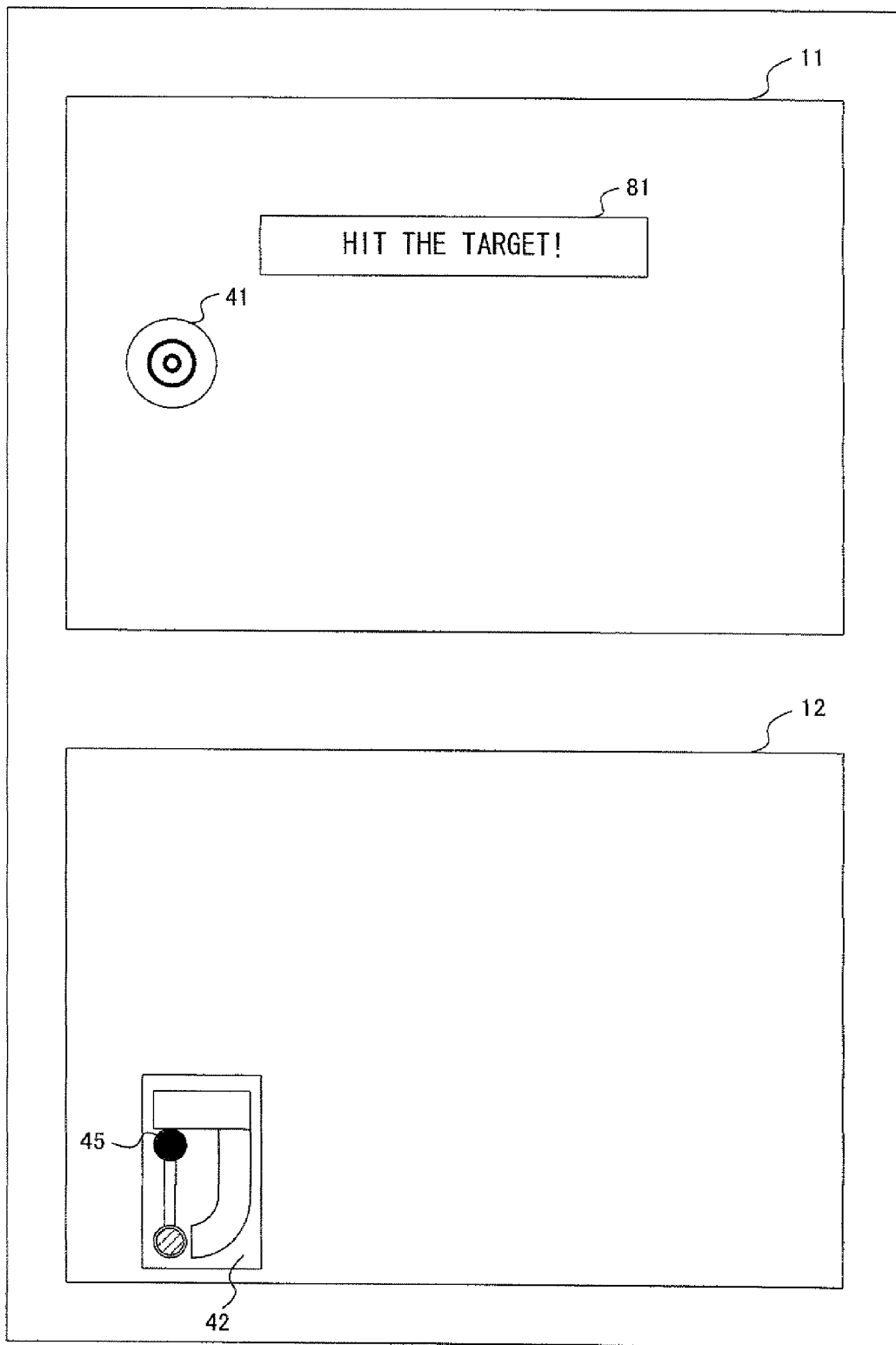
FIG. 12 shows an example of settings images.

At step S31, settings images for setting the filter table are displayed on the LCDs 11 and 12. FIG. 12 shows an example of the settings images. As shown in FIG. 12, the second LCD 12 displays, as a settings image, an image in which the control object 42 is placed such that the firing instruction section 45 is in a predetermined position. Here, the predetermined position is a position in the area (e.g., a position at the center of the area) that has been selected at step S30 immediately prior to step S31. Note that, FIG. 12 shows the settings images which are displayed when the lower left area 53 is selected. The first LCD 11 displays a settings image in which an image of a target 41 is placed in a predetermined position and in which an image 81 prompting the player to perform a firing operation (a message "hit the target" in FIG. 12) is provided. In response to the display of the settings images, the player performs a firing operation, i.e., an operation to touch the firing instruction section 45. After step S31, a process at step S32 is performed.

At step S32, the CPU core 21 obtains an input position from the touch panel 15. The process at step S32 is the same as the above-described process at step S2. In the following step S33, the CPU core 21 obtains an operation sound detected by the microphone 33. The process at step S33 is the same as the above-described process at step S3. After step S33, a process at step S34 is performed.

At step S34, the CPU core 21 determines whether or not the input position obtained at step S32 is present within the firing instruction area. The process at step S34 is the same as the above-described step S4. When a result of the determination at step S34 is positive, a process at step S35 is performed. On the other hand, when the result of the determination at step S34 is negative, the process at step S32 is performed again. To be specific, after displaying the settings images at step S31, the CPU core 21 performs the process at step S35 in the case where the player has performed a touch operation on the firing instruction area.

At step S35, the CPU core 21 determines, based on the operation sound detected at step S33, a filter characteristic of a filter to be associated with the area selected at step S30. For example, when a passband is determined to be the filter characteristic, a passband of the filter can be determined in the following manner the CPU core 21 calculates a frequency spectrum of the detected operation sound; specifies, in the calculated frequency spectrum, a frequency band in which the level (i.e., the sound intensity) is no lower than a predetermined value; and then the specified frequency band is determined to be the passband of the filter. The filter whose passband is determined in this manner passes a frequency component of the operation sound and removes other frequency components. At step S35 as described above, the area selected at step S30 is associated with the filter. After step S35, a process at step S36 is performed.

At the above-described step S35, for each of the areas 51 to 54, a characteristic of a filter to be associated therewith is determined based on a single input performed on each area. However, in other embodiments, multiple inputs may be obtained for each area by performing the processes at steps S30 to S34 a few times, and for each area, a characteristic of a filter to be associated therewith may be determined based on the multiple inputs. In this case, it is preferred at step S31 that not only the central position of each area is selected as a predetermined position (an input position specified for a user), but instructing the user to perform inputs on multiple points in each area.

Further, at the above-described step S35, for the purpose of associating filters having different passbands from each other with the respective areas 51 to 54, the passband of each filter is determined based on the operation sound. However, in other embodiments, a gain of each filter may be determined in addition to, or instead of, determining the passband of each filter. To be specific, the CPU core 21 determines gains of the filters to be associated with the respective areas, such that a result of the volume calculation is constant among the respective areas. In the case where the gains of the filters are determined at step S35, the CPU core 21 needs to prompt the player to perform touch operations on the respective areas with a same force (so that the volume of the operation sound is constant among the respective areas). For example, at step S31, the CPU core 21 may display the settings images such that a distance between the control object 42 and the target 41 is constant.

At step S36, the CPU core 21 sets, in the filter table, a combination of the area and the filter which have been associated with each other at step S35. To be specific, the combination of the area and the filter, which have been associated with each other at step S35, is added to the filter table indicated by the filter table data 64 stored in the RAM 24. Data indicating the filter table, to which the combination has been added, is newly stored in the RAM 24 as the filter table data 64. After step S36, a process at step S37 is performed.

At step S37, the CPU core 21 determines whether or not a filter has been set for all the areas (the areas 51 to 54) set on the input plane of the touch panel 15. This determination can be performed by referring to the filter table data 64. When a result of the determination at step S37 is positive, the CPU core 21 ends the processing shown in FIG. 11, and then performs the process at step S1. On the other hand, when the result of the determination at step S37 is negative, the CPU core 21 performs the process at step S30 again. Thereafter, the processes at steps S30 to S37 are repeatedly performed until a filter is set for all the areas 51 to 54.

By performing the processes at the above-described steps S30 to S37, a filter table, in which filters are associated with the respective areas 51 to 54, is created. Note that, the processes performed from step S1 are the same as those shown in FIG. 9. Therefore, in this exemplary variation, at step S24 of the volume calculation process, the filter table created by the processes at steps S30 to S37 is used to determine a to-be-used filter.

As described above, according to this exemplary variation, the game apparatus 10 determines the filter table based on operation sounds of touch operations actually performed by the player. As a result, even in the case where an acoustic characteristic in the housing 13 varies among individual game apparatuses, and thereby the detected operation sound varies among the individual game apparatuses, an appropriate filter table can be created for each individual game apparatus. In the case where there exist a plurality of types of game apparatuses compatible with the memory card 17 storing the game program, it can be considered that the acoustic characteristic in the housing 13 varies among the respective types of the game apparatuses. Even in such a case, according to this exemplary variation, an appropriate filter table can be created for each type of game apparatus.

Further, in the case of performing a sensory operation, which is performed with, e.g., a tap strength, the tap strength is perceived differently by each player. For example, an operation, which is performed by a player in response to an instruction "tap strongly", varies from player to player. Some player may think that he/she has tapped the touch panel strongly although a game process performed in response thereto is the one to be performed when the touch panel is tapped weakly. However, according to this exemplary variation, a sound, which occurs when the player performs an operation which the player feels to be a "strong tapping" operation, is stored so as to be associated with a filter for correcting the sound to be a sound that causes a game process, which is performed when the touch panel is tapped strongly, to be performed. In this manner, an appropriate filter table can be created in accordance with the player's operational feeling.

Still further, in other embodiments, in the case where a filter gain is determined at step S35, a filter table prepared in advance may be corrected in accordance with a strength of a touch operation performed by the player. To be specific, at step S35, the CPU core 21 calculates, in the same manner as the volume calculation process of the above-described embodiment, the volume of the detected operation sound by using the filter table, and then calculates the flying distance of the bullet 43. When the calculated flying distance exceeds a distance to the target 41 displayed at step S31, the gain of the filter that has been used to calculate the volume is reduced. When the calculated flying distance is shorter than the distance to the target 41 displayed at step S31, the gain of the filter that has been used to calculate the volume is increased. The gain of the filter is corrected such that a flying distance, which is calculated using the filter whose gain has been corrected, allows the bullet to hit the target 41.

As described above, an appropriate filter table can be created based on a touch operation performed by an individual player, by correcting a filter table, which is prepared in advance, in accordance with a strength of the touch operation (volume of an operation sound). To be specific, according to the foregoing description, volume of an operation sound of the player's first touch operation is used as reference volume, and when the player performs a touch operation with such a strength as to allow the reference volume to be obtained from the volume calculation, the flying distance coincides with a reference flying distance (i.e., a flying distance from the control object 42 to the target 41 in the settings images). Accordingly, a relationship between a strength of a touch operation and a flying distance of a bullet 43, which flying distance is obtained when the touch operation is performed with the strength, can be set appropriately for the player. This enables the player to provide, more precisely, an instruction using the operation sound of a touch operation.

In the above-described exemplary variation, the CPU core 21 determines the filter table based on the operation sound of a touch operation actually performed by the player. In other words, data, which associates an area on the input plane with a filter characteristic, is stored. Here, in other embodiments, instead of performing the processes at steps S35 and S36, the CPU core 21 may store, in the RAM 24, the sound data obtained at step S33. In other words, data, which associates an area on the input plane with an operation sound, may be generated and stored. In this case, it is conceivable that processes to be performed after step S3 are, for example, as follows: the CPU core 21 compares an operation sound, which is indicated by sound data associated with an area including the input position obtained at step S2, with an operation sound obtained at step S3; information indicating a result of the comparison is calculated as feature information; and by using this feature information, a process to cause an object to perform an action, or the like, is performed.

(Exemplary Variation for Other Games)

The above-described embodiment describes game processing using the input position and the operation sound of a touch operation, by taking, as an example, a case where the game apparatus 10 performs the game processing for causing an object to fire a bullet. To be specific, in the game processing described in the above embodiment, whether or not to cause the object to perform a predetermined action (an action to fire a bullet) is determined based on whether or not the input position is within a predetermined area, and in the case of causing the object to perform the predetermined action, a detail of the predetermined action (i.e., a flying distance) is determined based on the volume of the operation sound. Here, the game processing using the input position and the operation sound of the touch operation may be any game processing. Hereinafter, an example of the game processing will be described.

Figure 13:
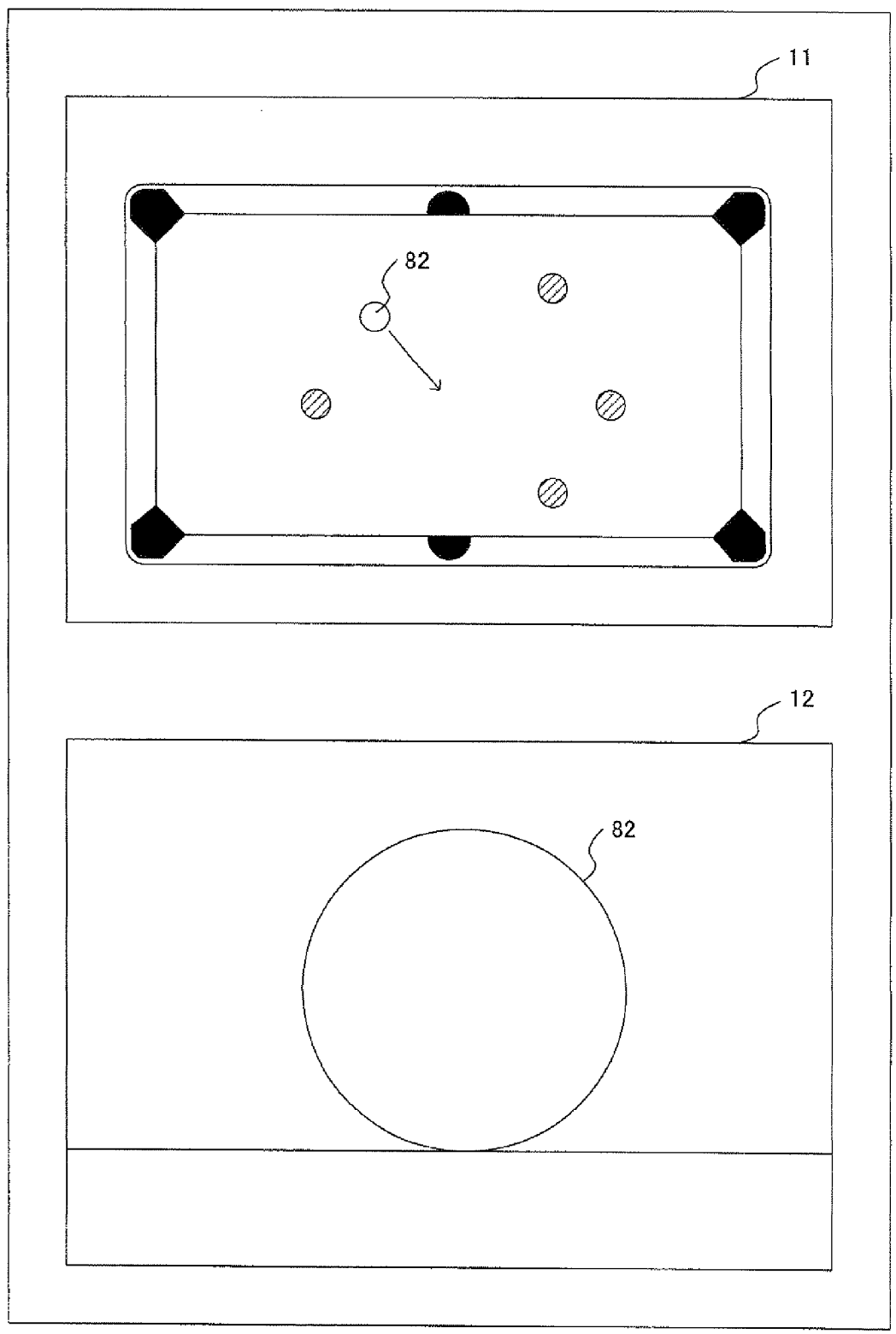
FIG. 13 shows an example of game images displayed in another game example.

Conceivable game processing other than the above-described game processing is, for example, game processing for determining two different game parameters based on the input position and the volume of the operation sound, respectively, which two game parameters are set for a controlled object. This game processing is performed in, for example, a billiards game described below. FIG. 13 shows an example of game images displayed in the billiards game. In this billiards game, the CPU core 21 of the game apparatus 10 displays, on the second LCD 12, an image showing a side view of a billiard ball 82. The first LCD 11 displays a game image showing a top view of a billiard table. A player performs a touch operation on an area in which the ball 82 is displayed, thereby providing an instruction to strike the ball 82. At this point, a rotation direction of the ball 82 (i.e., a position on the ball 82, on which the ball 82 is struck) is determined based on an input position. Also, a moving distance of the ball 82 (strength with which to strike the ball 82) is determined based on volume of an operation sound. In this case, by performing a single touch operation, the player determines, based on the input position, one of the two game parameters (a position on the ball 82, on which the ball 82 is struck) relating to an action of a controlled object (i.e., the ball 82), and determines, based on the volume of the operation sound, the other parameter (strength with which to strike the ball 82). Note that, in FIG. 13, a moving direction of the ball 82 is indicated by an arrow displayed on the first LCD 11. The moving direction can be changed by, for example, an operation performed on the cross switch 14a.

If, in the game processing described in the above embodiment, the bullet 43 and the control object 42 are regarded as separate objects, the game processing can be said to be processing for specifying, based on the input position, a controlled object (i.e., the bullet 43) and for determining, based on the volume, a detail of an action of the specified object (i.e., the flying distance). Thus, certain example embodiments are also applicable in the case of performing game processing for selecting, based on the input position, a controlled object from among a plurality of objects appearing in a game space, and for determining, based on the volume, a detail of an action of the selected object. Note that, as described above, when the player touches the railway 48, the control object 42 moves to a touched position. Here, an operation sound may be detected from the touching, and a moving speed of the control object 42 may be changed in accordance with the volume of the operation sound. In this case, the process at step S5 in FIG. 9 is performed prior to step S4, and at step S8, volume data calculated at step S5 is used to set the moving speed toward the input position. Also, a plurality of control objects 42 may be displayed (in this case, the object position data 69 is stored for each control object 42), and a control object 42 by which a bullet 43 is fired may be determined based on which control object 42 includes, in the firing instruction area thereof, the input position.

Further, in the above-described embodiment, in response to a touch operation directly performed on the control object 42 displayed on the second LCD, the game apparatus 10 causes the control object 42 to perform an action (i.e., an action to fire a bullet 43). In other words, an object, on which a touch operation to perform an input is performed, and an object, which performs an action in accordance with an instruction provided by the touch operation, are the same. However, in other embodiments, an object, on which a touch operation to perform an input is performed, and an object, which performs an action in accordance with an instruction provided by the touch operation, may be different. For example, in the case where the second LCD 12 displays an object such as a button or icon associated with a controlled object, the game apparatus 10 may cause, in response to a touch operation performed on a display position of the object such as a button or icon, the controlled object to perform an action.

Further, the above-described embodiment describes, as an example, the game processing for causing a game object, which appears in a game space and which is a controlled object, to perform an action. However, in certain example embodiments, a controlled object is not limited to a game object. In other embodiments, the game processing performed based on an input position and volume of an operation sound may be game processing for giving a predetermined effect at a position in a game space (e.g., game processing for creating a ripple on a water surface). In other words, the game apparatus 10 specifies, based on the input position, a position in the game space, and determines, based on the volume, a detail of an effect to be provided to the game space in the specified position. To be specific, the CPU core 21 of the game apparatus 10 displays, on the second LCD 12, an image of a water surface. When a touch operation is performed on an area in which the water surface is displayed, the CPU core 21 creates a ripple which spreads from the input position and whose magnitude corresponds to the volume. This enables the player to specify, by performing the touch operation, an originating point of the ripple as well as the magnitude of the ripple (an area over which the ripple spreads). Further, the game processing for creating the ripple may be applied in executing a game for moving a game object. For example, a game, in which a game object is moved by a touch operation for creating a ripple, can be executed, by causing the game object to move in a direction in which the ripple spreads and by a moving amount corresponding to the magnitude of the ripple.

In other embodiments, the game processing using an input position and an operation sound of a touch operation may be such game processing as follows: whether or not the operation sound satisfies a predetermined standard is determined; and when it is determined that the operation sound satisfies the predetermined standard, a process using the input position is performed. To be specific, the CPU core 21 calculates the volume of the operation sound, and determines whether or not the volume is greater than predetermined reference volume. When the volume is greater than the predetermined reference volume, the CPU core 21 performs a process based on the input position (in the above-described embodiment, the process for firing a bullet 43, for example). Note that, when the volume is no greater than the predetermined reference volume, the CPU core 21 does not perform the process based on the input position. Accordingly, when a touch operation is not performed with a particular force or stronger, the process based on the input position is not performed. This prevents the process from being performed due to an erroneous operation by the player. As another example, the process for determining whether or not the operation sound satisfies a predetermined standard may be such a process as to compare a waveform (or a frequency spectrum) of the operation sound with a reference waveform and determine whether or not these are similar. In this case, when the waveform of the operation sound is similar to the reference waveform, the CPU core 21 performs the process based on the input position, and when the waveform of the operation sound is not similar to the reference waveform, the CPU core 21 does not perform the process based on the input position. In this manner, the operation sound may be used to determine whether or not to perform the process based on the input position.

Further, when the predetermined standard as described above is used in the game processing, the CPU core 21 may determine, by using different reference values depending on the input position, whether or not the predetermined standard is satisfied. For example, in the case of determining whether or not the volume of the operation sound is greater than the predetermined reference volume, different values may be used depending on the input position (e.g., different values may be used for the above-described areas 51 to 54, respectively) as values of the predetermined reference volume. To be more specific, a relatively large reference value is used when the input position is relatively close to a setting position of the microphone, and a relatively small reference value is used when the input position is relatively distant from the setting position of the microphone. This allows the process for determining whether or not the predetermined standard is satisfied to be precisely performed by taking into account a distance between the microphone and the input position.

Still further, when the processes at steps S30 to S37 shown in FIG. 11 are performed in the case of using the different reference values depending on the input position, these processes may be performed, for example, as follows: at step S35, the CPU core 21 determines, based on the operation sound detected at step S33, a reference value to be associated with the area selected at step S30. In the case where the reference value is, for example, related to the volume of the operation sound, the reference value may be set to be a predetermined rate of the volume of the operation sound (e.g., 80%). At next step S36, the CPU core 21 sets the table so as to contain a combination of the area and the reference value which have been associated with each other at step S35. As a result, in the game processes at steps S2 to S11, by referring to the set table, a reference value can be determined based on the input position. Note that, in another example, instead of performing the processes at steps S35 and S36, the sound data obtained at step S33 may be stored in the RAM 24. In this case, the game processing performed after step S3 may be, for example, such processing as follows: the CPU core 21 calculates a reference value from sound data that is associated with an area including the input position obtained at step S2. By calculating, in the above manner, reference values based on touch operations which the player performs prior to the game starts, different reference values can be used depending on the input position.

(Exemplary Variation for Feature Information about the Operation Sound)

In the above-described embodiment, the game apparatus 10 calculates the volume of the operation sound caused by a touch operation, so as to use the operation sound as a game instruction. Then, the game processing is performed by using the calculated volume. Here, input information, which is used in the game processing together with the input position, is not limited to the volume of the operation sound, but may be any information as long as the information is a result of performing some kind of arithmetic processing on the operation sound. The information obtained as a result of the arithmetic processing is information indicating any feature of the operation sound (feature information). The feature information about the operation sound is a concept which includes not only the aforementioned volume but also a maximum amplitude of a sound signal of the operation sound, a peak frequency of the operation sound (a frequency in the frequency spectrum of the operation sound, at which frequency the level becomes maximum), a frequency band of the operation sound (a frequency band in the frequency spectrum of the operation sound, in which frequency band the level is at a predetermined value or higher), a degree of similarity between a waveform of the operation sound and a reference waveform, and the like. Based on the feature information as above, the game apparatus 10 may perform a game process for calculating any game parameter.

The game apparatus 10 is able to recognize a difference between operation sounds caused by touch operations, by calculating the feature information about the operation sounds. Therefore, if multiple input tools (styluses), which respectively produce different operation sounds when touch operations are performed therewith, are provided, a type of an input tool that has been used to perform a touch operation can be recognized by discerning a difference between the operation sounds caused by the touch operations performed with the respective input tools. For example, when a first stylus, whose operation sound has a relatively high frequency, and a second stylus, whose operation sound has a relatively low frequency, are used, the game apparatus 10 is able to recognize, in the following manner, a type of a stylus that has been used to perform a touch operation: when an operation sound caused by the touch operation is detected, the game apparatus 10 calculates, as feature information about the operation sound, the aforementioned peak frequency; and whether the stylus, used to perform the touch operation, is the first stylus or the second stylus can be determined based on whether or not the peak frequency is greater than a predetermined threshold value. Input tools may be distinguished from each other such that styluses, whose operation sounds have different frequency bands from each other, are provided and each stylus is recognized based on a frequency band of an operation sound thereof. Alternatively, styluses, whose operation sounds have different waveforms from each other, are provided and each stylus is recognized based on a degree of similarity between a waveform of an operation sound thereof and a reference waveform.

Further, in the case of specifying a type of an input tool that has been used to perform a touch operation, the game apparatus 10 may determine a type of an action, which the game apparatus 10 causes a controlled object to perform, based on the type of the input tool (in other words, based on the above-described feature information). For example, in the case of specifying a type of an input tool in the game of the above-described embodiment, the game apparatus 10 may change a type of a bullet to fire (or an effect produced by the bullet), in accordance with the type of the input tool. Further, in the above-described game process for providing a predetermined effect at a position in the game space, the game apparatus 10 may determine a type of the effect to provide, based on the type of the input tool (feature information).

To be specific, this exemplary variation of the present invention has features described below.

The present invention is a game program to be executed by a computer of a game apparatus comprising: an input device having an input plane on which an input operation using a predetermined operation tool is performed; and a microphone. The game program causes the computer to perform the following steps:
(1) an input position obtaining step of obtaining, for the input operation and from the input device, an input position on the input plane;
(2) a first operation sound obtaining step of obtaining, from the microphone, an operation sound that occurs due to the input operation;
(3) a determination step of determining whether the operation sound obtained at the first operation sound obtaining step is an operation sound caused by a first operation tool or an operation sound caused by a second operation tool; and
(4) a game process step of performing a game process by using the input position obtained at the input position obtaining step and a determination result obtained at the determination step.

(Exemplary Variation for the Operation Sound)

The above description describes that the operation sound is a sound which occurs when a touch operation is performed and which occurs when an input tool (stylus) contacts the touch panel 15. However, the operation sound may be any sound caused by a touch operation. For example, if the input tool has a mechanism therein for generating a sound in response to a touch operation, the sound generated by the input tool (which is not a contact sound) may be used as an operation sound. For example, a hammer-like input tool, which has a head portion having a bellows-like structure and having a cavity inside and which has a whistle mechanism for generating a sound of a particular frequency in accordance with the amount of air forced out of the cavity (so-called a knockout hammer or a squeaky hammer), generates a sound when hitting something. In the case of using such an input tool, the game apparatus 10 may obtain, as an operation sound, a sound generated by the input tool (which is not a contact sound). In this case, in the game processing, the filtering process is performed by using a filter whose passband is not a frequency band of a contact sound but a frequency band of the sound generated by the input tool.

(Exemplary Variation for the Manner of Obtaining an Operation Sound)

In the above-described embodiment, a sound, which is detected by the microphone 33 when a touch operation is performed, is obtained in order to obtain an operation sound. Here, a timing, at which a sound detected by the microphone 33 is obtained as an operation sound, may be any timing as long as the timing is determined in relation to a point when a touch operation is performed. Obtained as an operation sound is not necessarily a sound which is detected at the same time as the touch operation is performed. For example, when a distance between the touch panel 15 and the microphone 33 is long, or when a reverberating sound within the housing 13 is detected as an operation sound, a sound, which is detected when a few frame times have passed after a touch operation is performed, may be obtained as an operation sound. Further, in other embodiments, a timing of obtaining the operation sound may be changed based on the input position. For example, in the case where the input position is distant from the microphone by a predetermined distance or shorter, the game apparatus 10 may obtain, as an operation sound, a sound which is detected at the same time as a touch operation is performed. On the other hand, in the case where the input position is distant from the microphone by a longer distance than the predetermined distance, the game apparatus 10 may obtain, as an operation sound, a sound which is detected when a predetermined number of frame times have passed after a touch operation is performed.

(Exemplary Variation for the Number of Touch Panels)

In the above-described embodiment, the game apparatus 10 has only one touch panel, i.e., the touch panel 15. However, in other embodiments, the game apparatus 10 may comprise multiple touch panels. To be specific, for example, a transparent touch panel may be mounted on the screen of the first LCD 11. In this case, certain example embodiments are effective since there is a possibility that sounds respectively generated on the touch panels may be different from each other due to specifications or placements of the touch panels. In the case where the game apparatus 10 comprises multiple touch panels, the game apparatus 10 may change details of the process for calculating feature information, not only in accordance with the input position but also in accordance with a type of a touch panel on which an input has been performed (i.e., in accordance with on which touch panel an input has been performed). For example, a to-be-used filter may be determined based on the type of the touch panel on which the input has been performed. Alternatively, the amount of correction of the volume of the operation sound may be increased in accordance with an increase in a distance between the microphone and the touch panel on which the input has been performed. Further alternatively, in the case where the game apparatus 10 comprises multiple touch panels, a timing of obtaining the operation sound may be changed based on the type of the touch panel on which the input has been performed. To be specific, when an input is performed on a touch panel which is placed so as to be distant from the microphone by a predetermined distance or shorter, the game apparatus 10 may obtain, as an operation sound, a sound which is detected at the same time as a touch operation is performed, and when an input is performed on a touch panel which is placed so as to be distant from the microphone by a longer distance than the predetermined distance, the game apparatus 10 may obtain, as an operation sound, a sound which is detected when a predetermined number of frame times have passed after a touch operation is performed.

While certain example embodiments have been described in detail, the foregoing description is in all aspects illustrative and not restrictive. It is understood that numerous other modifications and variations can be devised without departing from the scope of the invention.

What is claimed is:

1. A non-transitory computer-readable storage medium storing computer readable instructions to be executed by a computing system that includes an input device having a touch screen display that is configured to detect a touch operation that is performed by a user, and a microphone, the stored instructions comprising instructions that are configured to:
   output an image to the touch screen display;
   obtain, from the input device, an input position which corresponds to an input operation performed by a user at a touched position on the touch screen display while the image is displayed on the touch screen display;
   obtain, from the microphone, an operation sound based on the performed input operation; and perform a game process based on the obtained input position and the obtained operation sound,
wherein the input position is a coordinate input position,
wherein the input position is obtained independently of the operation sound.

2. The medium of claim 1, wherein the instructions are further configured to calculate, by performing a calculation process that is based on the operation sound, feature information indicating a feature of the operation sound,
wherein the game process is further based on the feature information, and
the calculation process determines a detail in accordance with the obtained input position.

3. The medium of claim 2, wherein the instructions are further configured to:
determine a characteristic of a filter based on the input position; and
perform a filtering process on the operation sound, by using the determined characteristic of the filter, to obtain filtered operation sound,
wherein the calculation of the feature information from the operation sound is further based on the filtered operation sound.

4. The medium of claim 3, wherein the instructions are further configured to determine a frequency passband that is to be used for the filter based on the input position.

5. The medium of claim 2, wherein the instructions are further configured to:
determine an amplification rate for amplifying a signal of the operation sound based on the input position;
amplify the signal of the operation sound based on the determined amplification rate to obtain amplified operation sound data; and
calculate a volume of the operation sound as the feature information based on the amplified operation sound data.

6. The medium of claim 2, wherein the instructions are further configured to:
instruct a user to perform a second input operation on the touch screen display;
obtain, from the microphone, a second operation sound occurring due to the second input operation that is performed at a position within the predetermined area of the touch screen display;
determine, based on the second operation sound, the detail; and
generate and store association data that associates the predetermined area with the determined detail,
wherein the predetermined calculation process determines the detail based on the obtained input position being within the predetermined area of the stored association data.

7. The medium of claim 2, wherein the instructions are further configured to:
instruct a user to perform a second input operation on the touch screen display;
obtain, from the microphone, a second operation sound occurring due the second input operation that is performed on a second position within a predetermined area of the touch screen display;
generate and store association data that associates the predetermined area with the second operation sound;
select the second operation sound from the association data when the input position is within the predetermined area associated with the second operation sound; and
compare the second operation sound to the operation sound.

8. The medium of claim 1, wherein the instructions are further configured to:
determine whether or not the obtained operation sound satisfies a predetermined standard, the predetermined standard including using different reference values depending on the obtained input position; and
perform a game process using the obtained input position when the operation sound satisfies the predetermined standard.

9. The medium of claim 8, wherein the instructions are further configured to:
instruct a user to perform a second input operation on the touch screen display;
obtain, from the microphone, a second operation sound occurring due to the second input operation that is performed, in response to a provided instruction, at a second position within a predetermined area of the touch screen display;
set, based on the obtained second operation sound, a reference value used for when the input operation is performed on a position within the predetermined area; and
generate and store association data which associates the predetermined area with the set reference value,
wherein the game process uses the reference value which is associated with the predetermined area stored in the association data.

10. The medium of claim 1, wherein the instructions are further configured to:
calculate, by performing a predetermined calculation process on the operation sound, feature information indicating a feature of the operation sound; and
correct the feature information in accordance with the input position.

11. The medium of claim 10, wherein the instructions are further configured to calculate, as the feature information, volume of the operation sound.

12. The medium of claim 1, wherein the game process includes causing a controlled object to perform a predetermined action based on the input position and the operation sound.

13. The medium of claim 12, wherein
the image includes a first object,
wherein the game process includes:
determining, when the input position and a display position of the first object are in a predetermined relationship, whether or not to cause a second object, which is the same as or different from the first object, to perform the predetermined action; and
causing, when the second object is to perform the predetermined action, the second object to perform an action that corresponds to the operation sound.

14. The medium of claim 12, wherein
the image includes a first object,
wherein the game process includes:
specifying, when the input position and a display position of the first object are in a predetermined relationship, a second object which is the same as or different from the first object; and
causing the second object to perform an action corresponding to the operation sound.

15. The medium of claim 12, wherein
the image includes the controlled object,
wherein the game process includes:
  determining, based on the input position, a value of a first game parameter relating to the predetermined action of the controlled object; and
  determining, based on the operation sound, a value of a second game parameter that is different from the first game parameter and which relates to the predetermined action of the controlled object.

16. The medium of claim 13, wherein the instructions are further configured to determine, based on the volume of the operation sound, an amount of the action that corresponds to the operation sound of the second object.

17. The medium of claim 13, wherein the instructions are further configured to determine, based on the operation sound, a type of the action of the second object.

18. The medium of claim 1, wherein the instructions are further configured to:
  specify, based on the input position, a position in a game space; and
  determine, based on the operation sound, a detail of an effect to be provided to the game space in the specified position.

19. The medium of claim 18, wherein the instructions are further configured to determine a degree of the effect in accordance with volume of the operation sound.

20. The medium of claim 18, wherein the instructions are further configured to determine a type of the effect in accordance with the operation sound.

21. The medium of claim 1, wherein the instructions are further configured to:
  detect an input performed on the surface; and
  obtain, as the operation sound, a sound which is detected by the microphone at a timing that is set in relation to a point when the input is detected.

22. The medium of claim 1, wherein:
  the instructions are further configured to process the operation sound based on the obtained input position to obtain changed sound data, and
  the game process is further based on the changed sound data.

23. A game apparatus comprising:
  an input position detecting unit which detects an input position that corresponds to an input operation performed by a user at a touched position on a touch screen display while an image is displayed thereon;
  an operation sound detecting unit which detects an operation sound that occurs due to the input operation being performed by the user on the touch screen display; and
  a processing system that includes at least one processor, the processing system being configured to perform a game process by using the input position and the operation sound obtained by the operation sound detecting unit,
  wherein the input position is a coordinate input position,
  wherein the input position detecting unit detects the input position independently of the operation sound.

24. The game apparatus of claim 23, wherein the processing system is further configured to calculate, by performing a calculation process that is based on the operation sound, feature information indicating a feature of the operation sound,
  wherein the game process is further based on the feature information, and
  wherein the calculation process determines a detail in accordance with the obtained input position.

25. A computing system comprising:
  a processing system that includes at least one processor, the processing system configured to:
    output an image to a touch screen display;
    receive positional data based on an input operation that is detected on an input surface of the touch screen display, the input operation being performed at a touch position on the input surface while the image is output to the touch screen display for display thereon;
    receive sound data that occurs due to the input operation being performed at the touch position on the input surface; and
    perform a process based on the positional data and the sound data,
  wherein the positional data is received independently of the received sound data.

26. The computing system of claim 25, wherein the processing system is further configured to process the sound data based on the positional data.

27. The computing system of claim 25, further comprising the touch screen display, wherein the processing system is further configured to create a plurality of areas associated with portions of the surface of the touch screen display, and the process is further based on identifying which one of the plurality of areas the input position is located within.

28. The computing system of claim 25, wherein the processing system is further configured to calculate feature information indicating a feature in the sound data by performing a predetermined calculation process that is based on the sound data,
  wherein the process is further based on the feature information, and
  wherein the predetermined calculation process determines a detail in accordance with the input position.

29. A handheld computing apparatus comprising:
  a housing having a form factor to be held by a hand of a user;
  an input touch surface that is disposed in the housing, the input touch surface configured to:
    accept a first input operation that is performed by the user to a first position on the input touch surface; and
    accept a second input operation that is performed by a user to a second position on the input touch surface, the second position being different from the first position;
  a microphone that is disposed in the housing, the microphone configured to:
    detect a first sound that is based on the first input operation performed by the user; and
    detect a second sound that is based on the second input operation performed by the user, the second sound being different from the first sound; and
  a processing system that includes at least one processor, the processing system disposed in the housing and configured to:
    output a first image to a display that is generated based on the first position and the first sound; and
    output a second image that is different from the first image to the display, the second image being based on the second position and the second sound,
  wherein the first position is determined independently of the detected first sound.

* * * * *